(12) United States Patent
Mergen et al.

(10) Patent No.: US 7,929,597 B2
(45) Date of Patent: Apr. 19, 2011

(54) EQUALIZER FOR A RECEIVER IN A WIRELESS COMMUNICATION SYSTEM

(75) Inventors: Gokhan Mergen, Campbell, CA (US); Parvathanathan Subrahmanya, Sunnyvale, CA (US); Nitin Kasturi, Los Gatos, CA (US); Rajesh Sundaresan, Bangalore (IN)

(73) Assignee: Qualcomm Incorporated, San Diego, CA (US)

( * ) Notice: Subject to any disclaimer, the term of this patent is extended or adjusted under 35 U.S.C. 154(b) by 1130 days.

(21) Appl. No.: 11/399,891

(22) Filed: Apr. 7, 2006

(65) Prior Publication Data

US 2007/0110200 A1 May 17, 2007

Related U.S. Application Data

(60) Provisional application No. 60/737,459, filed on Nov. 15, 2005.

(51) Int. Cl.
*H04B 1/10* (2006.01)
(52) U.S. Cl. ......... 375/232; 375/348; 375/350; 375/355
(58) Field of Classification Search ............... 375/232, 375/348, 350, 355
See application file for complete search history.

(56) References Cited

U.S. PATENT DOCUMENTS

| | | | |
|---|---|---|---|
| 5,533,066 A | 7/1996 | Yamaguchi et al. | |
| 6,130,909 A * | 10/2000 | Anvari et al. | 375/232 |
| 6,314,133 B1 * | 11/2001 | Kakura et al. | 375/230 |
| 7,130,342 B2 | 10/2006 | Buckley et al. | |
| 7,483,480 B2 * | 1/2009 | Guo et al. | 375/232 |
| 7,489,749 B2 * | 2/2009 | Liu | 375/348 |
| 2004/0125895 A1 * | 7/2004 | Buckley et al. | 375/340 |
| 2004/0213339 A1 * | 10/2004 | Smee et al. | 375/232 |
| 2008/0310484 A1 * | 12/2008 | Shattil | 375/146 |

FOREIGN PATENT DOCUMENTS

EP 0602249 6/1994

(Continued)

OTHER PUBLICATIONS

International Search Report & Written Opinion, PCT/US06/060947, International Search Authority, European Patent Office, Aug. 24, 2007.

(Continued)

*Primary Examiner* — David B Lugo
(74) *Attorney, Agent, or Firm* — Howard H. Seo; Sayed H. Beladi

(57) ABSTRACT

Techniques for performing equalization at a receiver are described. In an aspect, equalization is performed by sub-sampling an over-sampled input signal to obtain multiple sub-sampled signals. An over-sampled channel impulse response estimate is derived and sub-sampled to obtain multiple sub-sampled channel impulse response estimates. At least one set of equalizer coefficients is derived based on at least one sub-sampled channel impulse response estimate. At least one sub-sampled signal is filtered with the at least one set of equalizer coefficients to obtain at least one output signal. One sub-sampled signal (e.g., with largest energy) may be selected and equalized based on a set of equalizer coefficients derived from an associated sub-sampled channel impulse response estimate. Alternatively, the multiple sub-sampled signals may be equalized based on multiple sets of equalizer coefficients, which may be derived separately or jointly. The equalizer coefficients may be derived in the time domain or frequency domain.

22 Claims, 16 Drawing Sheets

FOREIGN PATENT DOCUMENTS

| EP | 1213853 | 6/2002 |
|---|---|---|
| WO | WO2004098138 | 11/2004 |

OTHER PUBLICATIONS

Baltersee J., et al., "Performance Bounds For A UMTS Rake Receiver With Imperfect Timing Synchronisation, XP010373281," Global Telecommunications Conference—Globecom 99, 1999, 1A, 105-109.

Harteneck M., et al., "Practical Implementation aspects of MMSE equalisation in a 3GPP HSDPA terminal," Vehicular Technology Conference, VTC -Spring, 2004, 1, 445-449.

Ling F., et al., "Convergence an Steady-State Behavior of a Phase-Splitting Fractionally spaces Equalizer, XP002445387," IEE Transactions on Communications, 1990, 38 (4), 418-425.

Meyr H., et al., "Digital Communication Receivers: Synchronization, Channel Estimation, and Signal Processing, Passage, NewYork, XP002398595," Digital Communication Receivers: Synchronization, Channel Estimation, and Signal Processing, Telecommunication and Signal Processing, 1998, John Wiley & Sons, 679-721.

Paulraj, et al., "Introduction to Space-Time Wireless Communications, XP002445390," 2003, Cambridge University Press, 92-93.

Proakis J. G, "Digital Communications, McGraw Hill, Inc, New York, XP002445391," 1995, Third Ed, 617-620.

Qureshi S. U. H., et al., "Performance and Properties Of A T/2 Equalizer, XP000763830," NTC. Conference Record, 1997, 1, 111-1.

Simon Haykin , "Adaptive Filter Theory, 3rd edition," Prentice Hall, 1996.

Webster M., et al., "Frequency-domain techniques for the cyclostationary signals encountered in fractionally-spaced equalizers , XP01005903," Digital Signal Processing 2, 1992, 5 Conf. 17, 705-708.

* cited by examiner

EQUALIZER FOR A RECEIVER IN A WIRELESS COMMUNICATION SYSTEM

The present application claims priority to provisional U.S. Application Ser. No. 60/737,459, entitled "FFT Based Methods for Equalization of WCDMA Downlink Signals," filed Nov. 15, 2005, assigned to the assignee hereof and incorporated herein by reference.

BACKGROUND

I. Field

The present disclosure relates generally to communication, and more specifically to techniques for receiving a signal in a wireless communication system.

II. Background

Wireless communication systems are widely deployed to provide various communication services such as voice, packet data, video, broadcast, messaging, and so on. These systems may be multiple-access systems capable of supporting communication for multiple users by sharing the available system resources. Examples of such multiple-access systems include Code Division Multiple Access (CDMA) systems, Time Division Multiple Access (TDMA) systems, and Frequency Division Multiple Access (FDMA) systems.

A wireless device (e.g., a cellular phone) in a CDMA system typically employs a rake receiver. The rake receiver includes one or more searcher elements and multiple demodulation elements, which are commonly referred to as searchers and fingers, respectively. Due to the relatively wide bandwidth of a CDMA signal, a wireless communication channel is assumed to be composed of a finite number of resolvable signal paths, or multipaths. Each multipath is characterized by a particular complex gain and a particular time delay. The searcher(s) search for strong multipaths in a received signal, and fingers are assigned to the strongest multipaths found by the searcher(s). Each finger processes its assigned multipath and provides symbol estimates for that multipath. The symbol estimates from all assigned fingers are then combined to obtain final symbol estimates. The rake receiver can provide acceptable performance for a CDMA system operating at low signal-to-interference-and-noise ratios (SNRs).

The rake receiver has a number of shortcomings. First, the rake receiver is not able to effectively handle multipaths with time delays separated by less than one chip period, which is often referred to as a "fat-path" scenario. Second, the rake receiver typically provides suboptimal performance at high geometry, which corresponds to high SNRs. Third, complicated circuitry and control functions are normally needed to search the received signal to find strong multipaths, to assign fingers to newly found multipaths, and to de-assign fingers from vanishing multipaths.

There is therefore a need in the art for a receiver that can ameliorate the shortcomings of a rake receiver.

SUMMARY

Techniques for performing equalization at a receiver (e.g., a wireless device or a base station) in a wireless communication system are described herein. In one aspect, equalization is performed by sub-sampling an over-sampled input signal to obtain multiple sub-sampled signals. An over-sampled channel estimate (e.g., an over-sampled channel impulse response estimate) may be derived and sub-sampled to obtain multiple sub-sampled channel estimates. For example, the input signal and the channel estimate may be over-sampled at multiple times chip rate, and the sub-sampled signals and the sub-sampled channel estimates may be at chip rate and may correspond to different sampling time instants. At least one set of equalizer coefficients is derived based on at least one sub-sampled channel estimate. At least one sub-sampled signal is then filtered with the at least one set of equalizer coefficients to obtain at least one output signal. In one embodiment, one sub-sampled signal (e.g., with the largest energy) is selected for equalization and is filtered with a set of equalizer coefficients derived based on an associated sub-sampled channel estimate. In other embodiments, the multiple sub-sampled signals are equalized based on multiple sets of equalizer coefficients, which may be derived separately or jointly based on the multiple sub-sampled channel estimates.

In another aspect, equalization is performed on an over-sampled input signal based on equalizer coefficients derived in the frequency domain. A channel impulse response estimate is derived and transformed to obtain a channel frequency response estimate. Time-domain covariance values for input samples may be determined and transformed to obtain frequency-domain covariance values. Frequency-domain equalizer coefficients are derived based on the channel frequency response estimate and the frequency-domain covariance values. The frequency-domain equalizer coefficients are transformed to obtain time-domain equalizer coefficients, which are used to filter the input samples.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
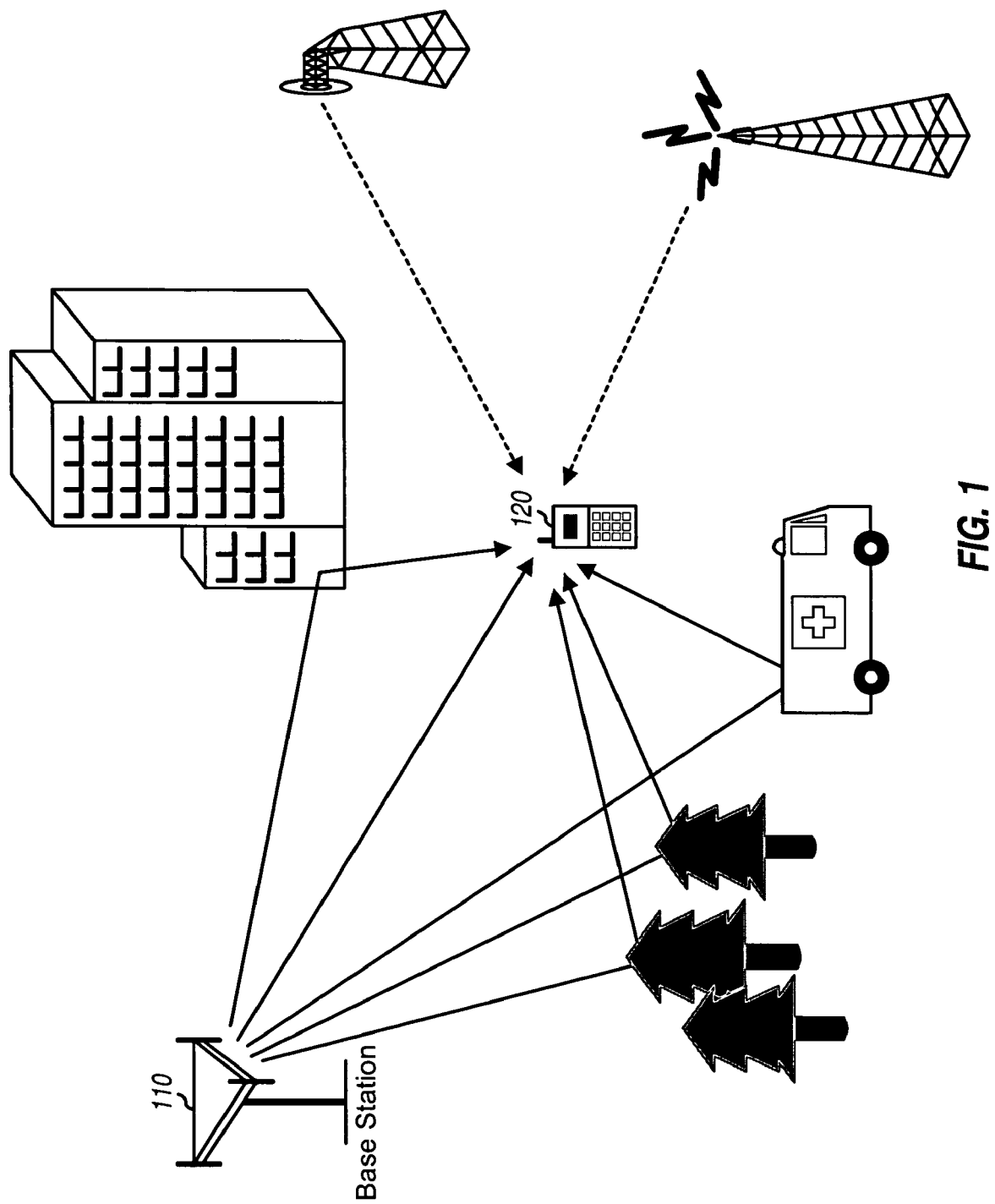
FIG. 1 shows a transmission in a wireless communication system.

FIG. 1 shows an exemplary transmission in a wireless communication system. For simplicity, FIG. 1 shows only one base station 110 and one wireless device 120. A base station is generally a fixed station that communicates with the wireless devices and may also be called a Node B, an access point, or some other terminology. A wireless device may be fixed or mobile and may also be called a user equipment (UE), a mobile station, a user terminal, a subscriber unit, or some other terminology. A wireless device may be a cellular phone, a personal digital assistant (PDA), a wireless modem card, or some other device or apparatus.

Base station 110 transmits a radio frequency (RF) signal to wireless device 120. This RF signal may reach wireless device 120 via one or more signal paths, which may include a direct path and/or reflected paths. The reflected paths are created by reflections of radio waves due to obstructions (e.g., buildings, trees, vehicles, and other structures) in the wireless environment. Wireless device 120 may receive multiple instances or copies of the transmitted RF signal. Each received signal instance is obtained via a different signal path and has a particular complex gain and a particular time delay determined by that signal path. The received RF signal at wireless device 120 is a superposition of all received signal instances at the wireless device. Wireless device 120 may also receive interfering transmissions from other transmitting stations. The interfering transmissions are shown by dashed lines in FIG. 1.

The equalization techniques described herein may be used for various communication systems such as CDMA, TDMA, FDMA, orthogonal frequency division multiple access (OFDMA), and single-carrier FDMA (SC-FDMA) systems. A CDMA system may implement one or more radio access technologies (RATs) such as cdma2000, Wideband-CDMA (W-CDMA), and so on. cdma2000 covers IS-2000, IS-856, and IS-95 standards. A TDMA system may implement a RAT such as Global System for Mobile Communications (GSM). These various RATs and standards are known in the art. W-CDMA and GSM are described in documents from a consortium named "3rd Generation Partnership Project" (3GPP). cdma2000 is described in documents from a consortium named "3rd Generation Partnership Project 2"(3GPP2). 3GPP and 3GPP2 documents are publicly available. An OFDMA system transmits modulation symbols in the frequency domain on orthogonal frequency subcarriers using OFDM. An SC-FDMA system transmits modulation symbols in the time domain on orthogonal frequency subcarriers.

The equalization techniques described herein may also be used for a wireless device as well as a base station. For clarity, these techniques are described below for a wireless device in a CDMA system, which may be a W-CDMA system or a cdma2000 system. Certain portions of the description are for a W-CDMA system.

Figure 2:
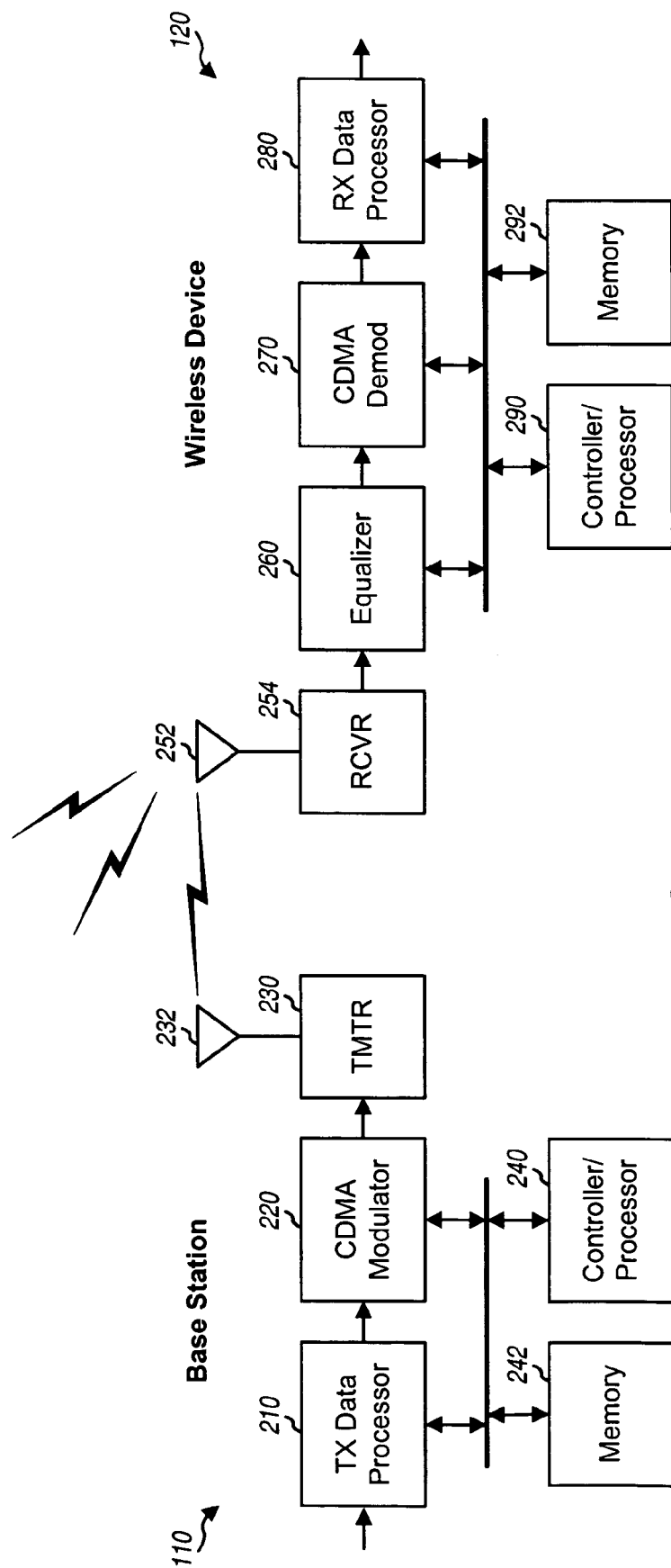
FIG. 2 shows a block diagram of a base station and a wireless device.

FIG. 2 shows a block diagram of base station 110 and wireless device 120. At base station 110, a transmit (TX) data processor 210 receives traffic data for the wireless devices being served, processes (e.g., encodes, interleaves, and symbol maps) the traffic data to generate data symbols, and provides the data symbols to a CDMA modulator 220. As used herein, a data symbol is a modulation symbol for data, a pilot symbol is a modulation symbol for pilot, a modulation symbol is a complex value for a point in a signal constellation (e.g., for M-PSK, M-QAM, and so on), a symbol, is generally a complex value, and pilot is data that is known a priori by both the base station and the wireless device. CDMA modulator 220 processes the data symbols and pilot symbols as described below and provides output chips to a transmitter (TMTR) 230. Transmitter 230 processes (e.g., converts to analog, amplifies, filters, and frequency upconverts) the output chips and generates an RF signal, which is transmitted from an antenna 232.

At wireless device 120, an antenna 252 receives the transmitted RF signal via direct and/or reflected paths and provides a received RF signal to a receiver (RCVR) 254. Receiver 254 processes (e.g., filters, amplifies, frequency downconverts, and digitizes) the received RF signal to obtain received samples. Receiver 254 may also perform pre-processing on the received samples and provides input samples to an equalizer 260. The pre-processing may include, e.g., automatic gain control (AGC), frequency correction, digital filtering, sample rate conversion, and so on. Equalizer 260 performs equalization on the input samples as described below and provides output samples. A CDMA demodulator (Demod) 270 processes the output samples in a manner complementary to the processing by CDMA modulator 220 and provides symbol estimates, which are estimates of the data symbols sent by base station 110 to wireless device 120. A receive (RX) data processor 280 processes (e.g., symbol demaps, deinterleaves, and decodes) the symbol estimates and provides decoded data. In general, the processing by CDMA demodulator 270 and RX data processor 280 is complementary to the processing by CDMA modulator 220 and TX data processor 210, respectively, at base station 110.

Controllers/processors 240 and 290 direct operation of various processing units at base station 110 and wireless device 120, respectively. Memories 242 and 292 store data and program codes for base station 110 and wireless device 120, respectively.

For CDMA, multiple orthogonal channels may be obtained with different orthogonal codes. For example, multiple orthogonal physical channels are obtained with different orthogonal variable spreading factor (OVSF) codes in W-CDMA, and multiple orthogonal traffic channels are obtained with different Walsh codes in cdma2000. The orthogonal channels may be used to send different types of data (e.g., traffic data, control data, broadcast data, pilot, and so on) and/or traffic data for different wireless devices.

Figure 3:
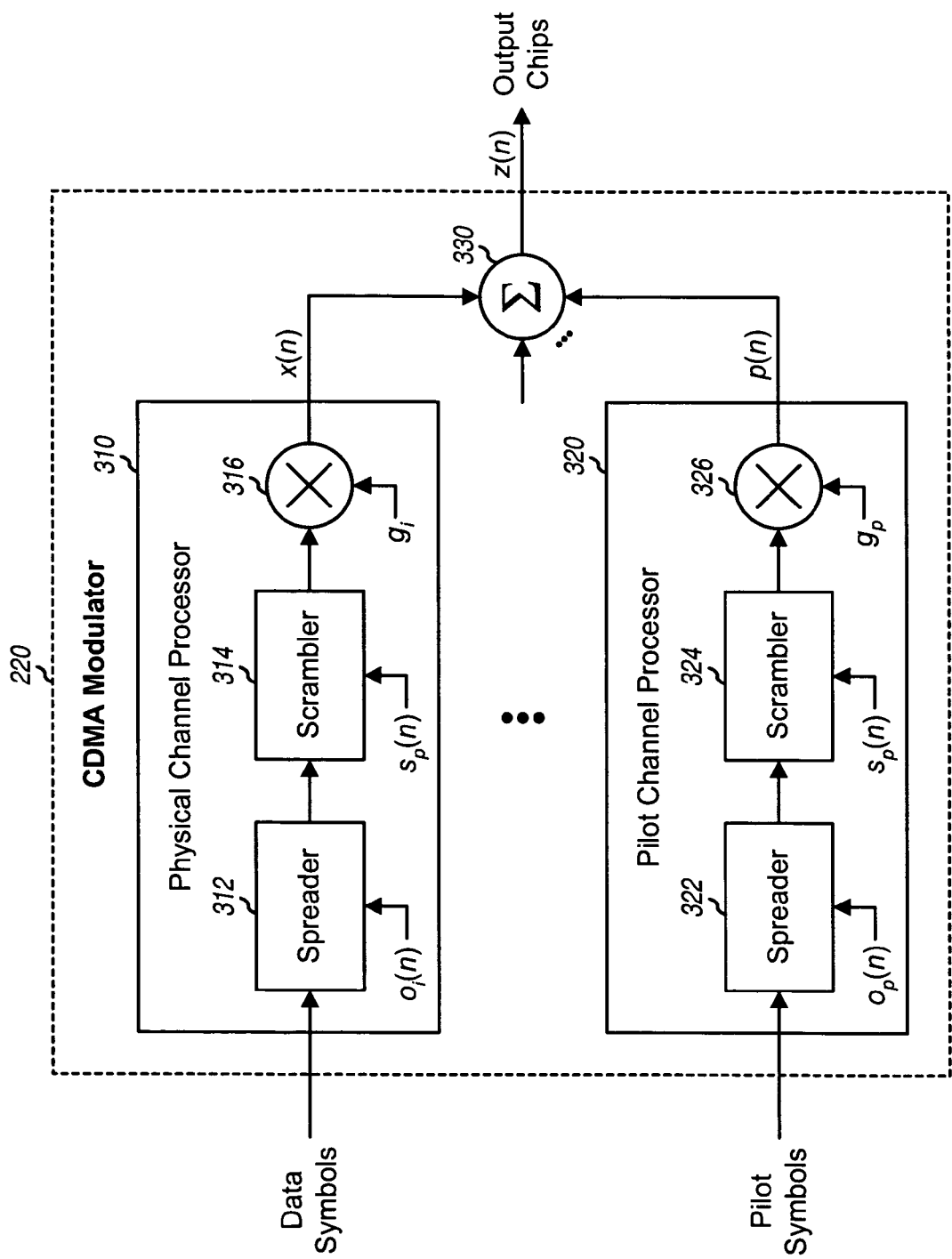
FIG. 3 shows a block diagram of a CDMA modulator at the base station.

FIG. 3 shows a block diagram of CDMA modulator 220 at base station 110. For clarity, the following description is for W-CDMA. CDMA modulator 220 includes a physical channel processor 310 for each physical channel used for traffic data and a pilot channel processor 320 for pilot. Within processor 310 for physical channel i used for wireless device 120, a spreader 312 spreads data symbols with an OVSF code $o_i(n)$ for physical channel i and provides data chips. Spreader 312 repeats each data symbol multiple times to generate N replicated symbols, where N is the length of OVSF code $o_i(n)$. Spreader 312 then multiplies the N replicated symbols with the N chips of OVSF code $o_i(n)$ to generate N data chips for the data symbol. A scrambler 314 multiplies the data chips with a scrambling sequence $s_p(n)$ for base station 110. A multiplier 316 scales the output of scrambler 314 and provides output chips x(n) for physical channel i.

Within pilot channel processor 320, a spreader 322 spreads pilot symbols with an OVSF code $o_p(n)$ for pilot, which is a sequence of all zeros, and provides pilot chips. A scrambler 324 multiplies the pilot chips with the scrambling sequence $s_p(n)$. A multiplier 326 scales the output of scrambler 324 and provides output chips p(n) for the pilot channel. A summer 330 sums the output chips for all physical channels and provides output chips z(n) for base station 110. The chip rate is 3.84 mega-chips/second (Mcps) for W-CDMA and is 1.2288 Mcps for cdma2000.

At wireless device 120, the time-domain input samples from receiver 254 may be expressed as:

$$y(n) = h(n) \otimes x(n) + w(n) \qquad \text{Eq (1)}$$

$$= \sum_{i=-\infty}^{\infty} h(i) \cdot x(n-i) + w(n),$$

where x(n) is the signal component of interest for wireless device 120,
  h(n) is an impulse response of the wireless channel between base station 110 and wireless device 120,
  w(n) is the total noise and interference observed by the desired signal x(n),
  y(n) is the input samples at wireless device 120, and
  $\otimes$ denotes a convolution.

In equation (1), w(n) includes signal components for the other physical channels from base station 110, noise from various sources, and interference from other transmitting stations. For simplicity, w(n) is assumed to be additive white Gaussian noise (AWGN) with zero mean and a variance of $\sigma^2$.

Equation (1) may be expressed in the frequency domain as follows:

$$Y(\omega) = H(\omega) \cdot X(\omega) + W(\omega), \qquad \text{Eq (2)}$$

where $Y(\omega)$, $H(\omega)$, $X(\omega)$ and $W(\omega)$ are frequency-domain representations of y(n), h(n), x(n) and w(n), respectively. A frequency-domain representation may be obtained by taking a discrete Fourier transform (DFT) or a fast Fourier transform (FFT) of a time-domain representation. A time-domain representation may be obtained by taking an inverse discrete Fourier transform (IDFT) or an inverse fast Fourier transform (IFFT) of a frequency-domain representation. For simplicity, the desired signal $X(\omega)$ is assumed to be white with unit power. The whiteness assumption is reasonable because of the scrambling with the pseudo-random scrambling sequence $s_p(n)$ at base station 110.

An estimate of the desired signal $X(\omega)$ may be obtained based on a linear minimum mean square error (LMMSE) technique, as follows:

$$\hat{X}(\omega) = \frac{H^*(\omega)}{|H(\omega)|^2 + \sigma^2} \cdot Y(\omega) \qquad \text{Eq (3)}$$

$$= C(\omega) \cdot Y(\omega),$$

where $C(\omega)$ is an LMMSE filter response, $\hat{X}(\omega)$ is an estimate of $X(\omega)$, and "*" denotes a complex conjugate. As shown in equation (3), when $\sigma^2 \approx 0$ for high geometry, the LMMSE filter response becomes $C(\omega) \approx 1/H(\omega)$, and the LMMSE filter inverts the channel. This results in elimination of multipaths. When $\sigma^2$ is large for low geometry, the LMMSE filter response becomes $C(\omega) = H^*(\omega)/\sigma^2$, and the LMMSE filter performs matched filtering and is equivalent to a rake receiver.

The LMMSE filtering in (3) may also be performed in the time domain by convolving the input samples with a finite impulse response (FIR) filter having a frequency response of $C(\omega)$, as follows:

$$\hat{x}(n) = c(n) \otimes y(n) \qquad \text{Eq (4)}$$

$$= \sum_{i=1}^{2L} c(i) \cdot y(n-i),$$

where c(n) and $\hat{x}(n)$ are time-domain representations of $C(\omega)$ and $\hat{X}(\omega)$, respectively, and 2 L is the length of the FIR filter.

The received signal may be sampled at multiple (M) times the chip rate to obtain an over-sampled signal with M input samples for M sampling time instants in each chip period, where in general M>1. The M sampling time instants may be evenly spaced apart across a chip period and separated by $T_c/M$, where $T_c$ is one chip period. The over-sampled signal may be demultiplexed or sub-sampled to obtain M sub-sampled signals. Each sub-sampled signal contains input samples for one sampling time instant. The input samples for each sub-sampled signal are separated by one chip period. The quality of the sampled data is affected by the sampling time instant. Hence, the M sub-sampled signals may have different qualities and may be processed as described below to obtain an improved estimate of the transmitted signal.

The over-sampled signal is not stationary, but the M sub-sampled signals are stationary, which means that the statistics of the sub-sampled signals do not change if the origin or start of these signals is shifted. This stationary property of the sub-sampled signals may be exploited to derive equalizer coefficients that can provide a good estimate of the transmitted signal. The M sub-sampled signals may be viewed as M diversity branches, or simply, branches. Each branch corresponds to a different sampling time instant. The equalization techniques described herein may be used with any amount of oversampling. For clarity, the equalization techniques are specifically described below for the case in which the received signal is over-sampled at twice the chip rate (or Chip×2) to obtain input samples at Chip×2. Equalization may be performed on the Chip×2 input samples as described below.

Figure 4:
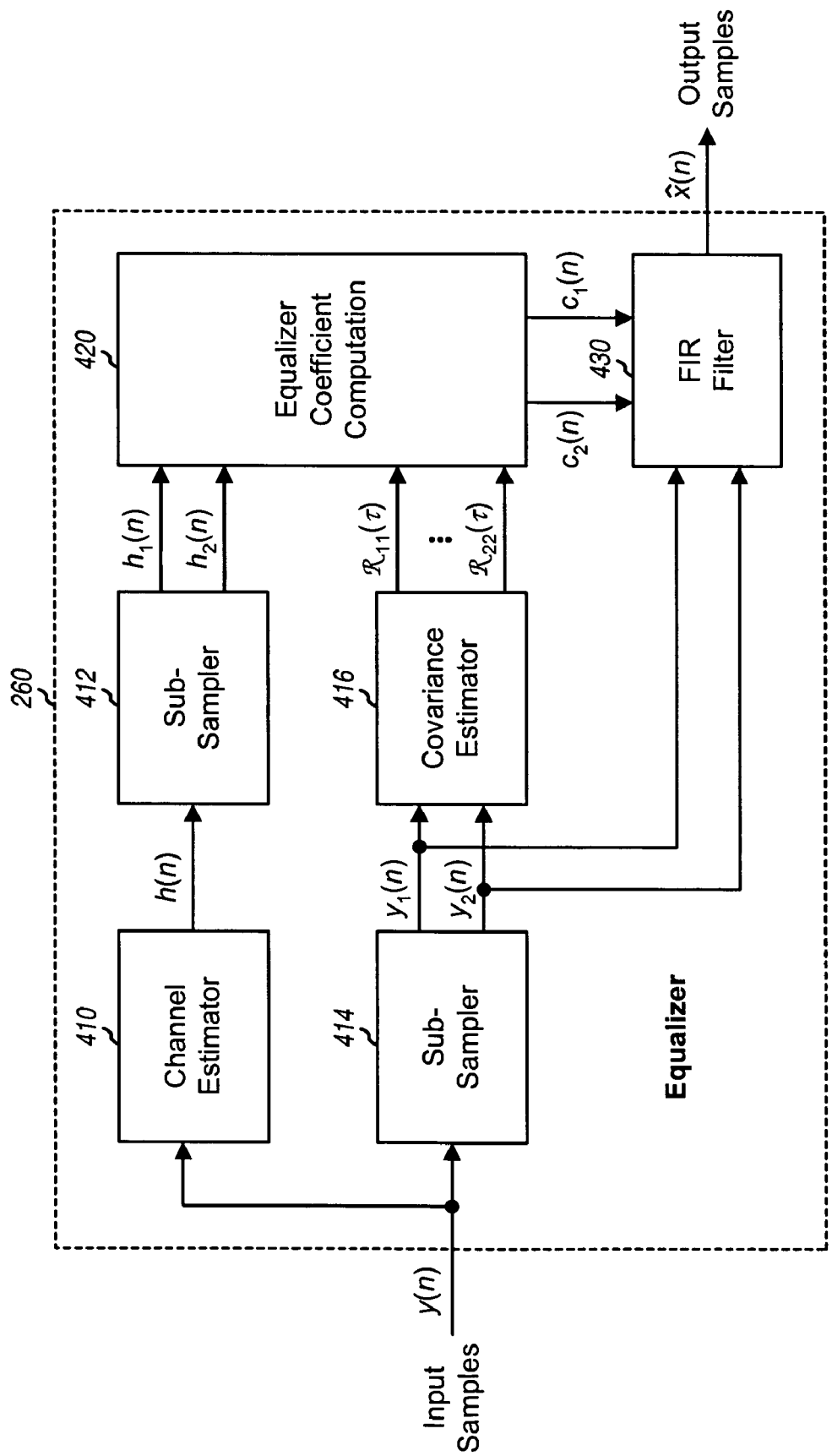
FIG. 4 shows a block diagram of an equalizer at the wireless device.

FIG. 4 shows a block diagram of an embodiment of equalizer 260 in FIG. 2. For this embodiment, the Chip×2 input samples y(n) are provided to a channel estimator 410 and a sub-sampler 414. Channel estimator 410 derives a channel impulse response estimate h(n) for the wireless channel between base station 110 and wireless device 120. The channel impulse response estimate h(n) is over-sampled and contains 2 L channel taps that are separated by half chip period. A sub-sampler 412 demultiplexes the over-sampled channel taps h(n) into on-time channel taps $h_1(n)$ and late channel taps $h_2(n)$ for two sampling time instants. Similarly, sub-sampler 414 demultiplexes the Chip×2 input samples y(n) into on-time samples $y_1(n)$ and late samples $y_2(n)$ for the two sampling time instants. A covariance estimator 416 determines the covariance of the on-time and late samples as described below and provides covariance values.

A computation unit 420 receives the on-time and late channel taps from sub-sampler 412 and the covariance values from estimator 416. Computation unit 420 derives equalizer coefficients $c_1(n)$ and $c_2(n)$ for the two sampling time instants based on the channel taps and the covariance values, as described below. A FIR filter 430 filters the on-time and late samples $y_1(n)$ and $y_2(n)$ with the equalizer coefficients $c_1(n)$ and $c_2(n)$ and provides output samples $\hat{x}(n)$ at chip rate (or Chip×1).

Figure 5A:
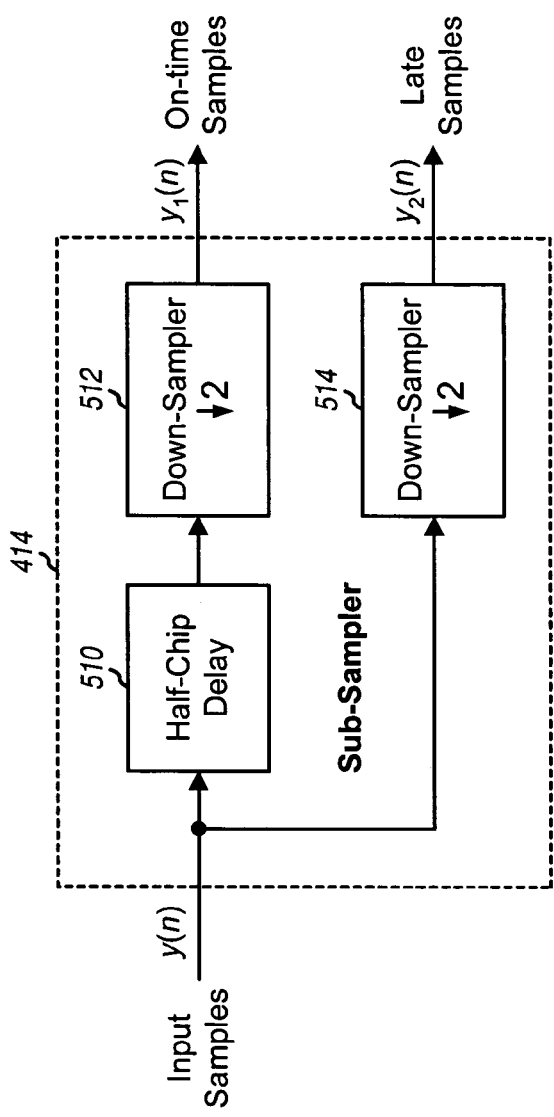
FIGS. 5A and 5B show a sub-sampler and sub-sampling, respectively.

FIG. 5A shows a block diagram of an embodiment of sub-sampler 414 in FIG. 4. Within sub-sampler 414, the Chip×2 input samples y(n) are provided to a delay unit 510 and a down-sampler 514. Delay unit 510 provides a delay of half chip period. A down-sampler 512 provides every other sample from delay unit 510 as the on-time samples $y_1(n)$. Down-sampler 514 provides every other input samples as the late samples $y_2(n)$. The on-time samples $y_1(n)$ and the late samples $y_2(n)$ are for two sampling time instants or branches and comprise all of the Chip×2 input samples y(n).

Figure 5B:
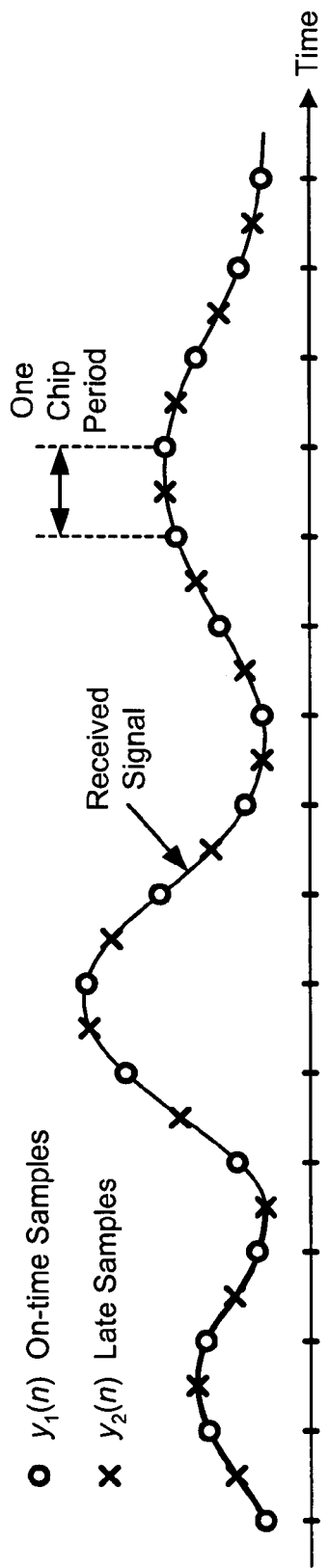

FIG. 5B shows the on-time samples $y_1(n)$ and late samples $y_2(n)$ from sub-sampler 414. The on-time samples $y_1(n)$ are offset by half chip period from the late samples $y_2(n)$.

Referring back to FIG. 4, channel estimator 410 may derive a channel impulse response estimate based on the pilot transmitted by base station 110. In an embodiment, the channel impulse response estimate ĥ(n) may be derived as follows:

$$\hat{h}(n) = \sum_{i=0}^{K-1} y(n+2i) \cdot o_p(i) \cdot s_p^*(i), \quad \text{Eq (5)}$$

for $$n = 1, \ldots, 2L,$$

where K is an accumulation length, which is an integer multiple of the length of the orthogonal code used for the pilot. The OVSF code for the pilot in W-CDMA has a length of 256 chips, and the Walsh code for the pilot in cdma2000 has a length of 128 chips. For equation (5), the channel tap at index n is obtained by descrambling the input samples with the scrambling sequence $s_p(n)$, despreading the descrambled samples with the pilot OVSF code $o_p(n)$, and accumulating over K chip periods. The channel impulse response estimate may also be derived in other manners known in the art. For simplicity, the following description assumes no channel estimation error, so that ĥ(n)=h(n).

Sub-sampler 412 demultiplexes the 2 L channel taps of the channel impulse response estimate h(n) into L on-time channel taps $h_1(n)$ and L late channel taps $h_2(n)$. Sub-sampler 412 may be implemented in the same manner as sub-sampler 414 in FIG. 5A. The on-time channel taps $h_1(n)$ represent the channel impulse response estimate for the on-time samples $y_1(n)$. The late channel taps $h_2(n)$ represent the channel impulse response estimate for the late samples $y_2(n)$.

A Chip×2 system may be considered as having a single-input multiple-output (SIMO) channel. The on-time and late samples may then be expressed as:

$$y_1(n) = h_1(n) \otimes x_1(n) + w_1(n), \text{ and}$$

$$y_2(n) = h_2(n) \otimes x_2(n) + w_2(n), \quad \text{Eq (6)}$$

where $w_1(n)$ and $w_2(n)$ are the total noise and interference for the on-time and late samples, respectively. In general, $y_1(n)$ and $y_2(n)$ are jointly wide-sense stationary, which means that (1) the statistics of each sub-sampled signal is independent of any shift in time and (2) the joint statistics of $y_1(n)$ and $y_2(n)$ are also independent of time. Equation set (6) may be expressed in the frequency domain as follows:

$$Y_1(\omega) = H_1(\omega) \cdot X_1(\omega) + W_1(\omega), \text{ and}$$

$$Y_2(\omega) = H_2(\omega) \cdot X_2(\omega) + W_2(\omega). \quad \text{Eq (7)}$$

Various equalization schemes may be used for the on-time and late samples shown in equation sets (6) and (7). Table 1 lists some equalization schemes and a short description for each scheme. Each equalization scheme is described in detail below.

TABLE 1

| Equalization Scheme | Description |
| --- | --- |
| Selective equalization | Perform equalization on the best branch and ignore the other branch. |
| Separate equalization and combining | Perform equalization on each branch separately and combine the results for both branches. |
| Joint equalization | Perform equalization on both branches jointly. |

For the first two equalization schemes in Table 1, equalization may be performed for a given branch based on an LMMSE filter derived for that branch. The LMMSE filter for each branch m may be expressed as:

$$C_m(\omega) = \frac{H_m^*(\omega)}{|H_m(\omega)|^2 + \sigma^2} \quad \text{Eq (8)}$$

$$= \frac{H_m^*(\omega)}{R_{mm}(\omega)},$$

for $m = 1, 2,$ where $H_m(\omega)$ is a DFT/FFT of $h_m(n)$, and
$R_{mm}(\omega)$ is a DFT/FFT of $\mathcal{R}_{mm}(\tau)$, which is an auto-correlation of $y_m(n)$.

Covariance estimator 416 in FIG. 4 may estimate the covariance of $y_1(n)$ and $y_2(n)$, as follows:

$$\mathcal{R}_{ij}(\tau) = \sum_{n=1}^{K} y_i(n) \cdot y_j^*(n-\tau), \quad \text{Eq (9)}$$

for $$i, j \in \{1, 2\},$$

where $\mathcal{R}_{ij}(\tau)$ denotes the covariance between $y_i(n)$ and $y_j(n-\tau)$, which is a time-shifted version of $y_j(n)$. As used herein, "covariance" covers both auto-correlation of a given sub-sampled signal $y_m(n)$ and cross-correlation between two sub-sampled signals $y_1(n)$ and $y_2(n)$. $\mathcal{R}_{ij}(\tau)$ may be derived for pertinent values of i and j and may also be derived for a range of time offsets, e.g., $\tau=-L/2+1, \ldots, L/2-1$. For auto-correlation, $\mathcal{R}_{mm}(\tau)$ is symmetric so that $\mathcal{R}_{mm}(-\tau)=\mathcal{R}_{mm}^*(-\tau)$. Hence, $\mathcal{R}_{mm}(\tau)$ may be derived for $\tau=0, \ldots, L/2-1$. The covariance may also be estimated in other manners known in the art.

Figure 6:
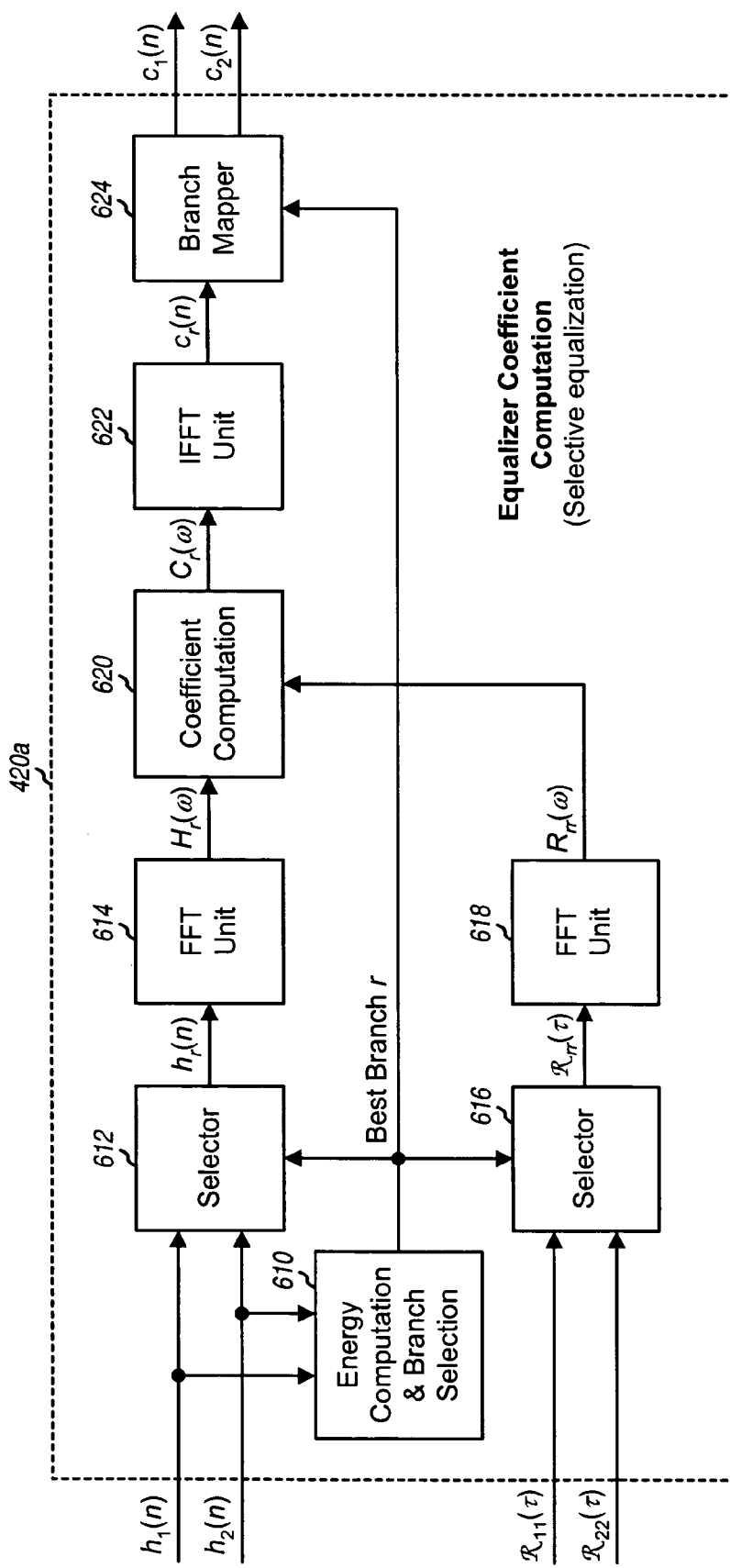
FIG. 6 shows a computation unit for selective equalization.

FIG. 6 shows a block diagram of an equalizer coefficient computation unit 420a for the selective equalization scheme. Computation unit 420a is an embodiment of computation unit 420 in FIG. 4.

Within unit 420a, an energy computation unit 610 receives the on-time and late channel taps $h_1(n)$ and $h_2(n)$ and computes the energy $E_m$ of the channel taps for each branch m, as follows:

$$E_m = \|h_m(n)\|^2 \quad \text{Eq (10)}$$

$$= \sum_{n=1}^{L} |h_m(n)|^2,$$

for $m = 1, 2.$

Unit 610 determines the best branch r as the branch with the largest energy, as follows:

$$r = \arg\left(\max_m \{E_m\}\right), \quad \text{Eq (11)}$$

where r∈{1, 2}.

A selector 612 receives the on-time channel taps $h_1(n)$ and the late channel taps $h_2(n)$ and provides the channel taps $h_r(n)$ for the best branch r. An FFT unit 614 transforms the L channel taps $h_r(n)$ to the frequency domain with an L-point FFT and provides L channel gains $H_r(\omega)$, for $\omega=1, \ldots, L$, for the best branch r. Similarly, a selector 616 receives the covariance values $\mathcal{R}_{11}(\tau)$ for the on-time samples and the covariance values $\mathcal{R}_{22}(\tau)$ for the late samples and provides the covariance values $\mathcal{R}_{rr}(\tau)$ for the best branch r. An FFT unit 618 performs an L-point FFT on the covariance values, which may be arranged as $\{\mathcal{R}_{11}(0), \ldots, \mathcal{R}_{rr}(L/2-1), 0, \mathcal{R}_{rr}^*(L/2-1), \ldots, \mathcal{R}_{rr}^*(1)\}$, where a zero is inserted to obtain L values for the FFT. FFT unit 618 provides L frequency-domain covariance values $R_{rr}(\omega)$, for $\omega=1, \ldots, L$.

A computation unit 620 then computes frequency-domain equalizer coefficients $C_r(\omega)$) for the best branch r, as follows:

$$C_r(\omega) = \frac{H_r^*(\omega)}{R_{rr}(\omega)}, \quad \text{Eq (12)}$$

for $$\omega = 1, \ldots, L.$$

Since $R_{rr}(\omega)$ is in the denominator, a small value for $R_{rr}(\omega)$ results in a large value for $C_r(\omega)$. Unit 620 may condition $R_{rr}(\omega)$ prior to computing for $C_r(\omega)$. For example, unit 620 may determine the largest value of $R_{rr}(\omega)$ as $$C_r(\omega) = \frac{H_r^*(\omega)}{R_{rr}(\omega)}, \quad \text{for } \omega = 1, \ldots, L. \quad \text{Eq (12)}$$

identify all frequency bins $\omega$ having small values of $R_{rr}(\omega)$, e.g., $R_{rr}(\omega) \leq 0.01 \times M$, and set $C_r(\omega)=0$ for all identified frequency bins. Alternatively, unit 620 may constrain $R_{rr}(\omega)$ to be greater than or equal to a predetermined value, e.g., $R_{rr}(\omega) \geq 0.01 \times M$.

An IFFT unit 622 performs an L-point IFFT on the L frequency-domain equalizer coefficients $C_r(\omega)$ and provides L time-domain equalizer coefficients $c_r(n)$ for the best branch r. A mapper 624 maps the equalizer coefficients $c_r(n)$ for the best branch r to either branch 1 or 2 and provides zeroed-out equalizer coefficients for the other branch, as follows:

$c_1(n)=c_r(n)$ and $c_2(n)=0$ if $r=1$, and $c_1(n)=0$ and $c_2(n)=c_r(n)$ if $r=2$ Eq (13)

Referring back to FIG. 4, FIR filter 430 may filter the on-time and late samples based on the equalizer coefficients, as follows:

$$\hat{x}(n) = c_1(n) \otimes y_1(n) + c_2(n) \otimes y_2(n), \quad \text{Eq (14)}$$

$$= \sum_{i=1}^{L} c_1(i) \cdot y_1(n-i) + \sum_{i=1}^{L} c_2(i) \cdot y_2(n-i).$$

All of the quantities in equation (14) are at the chip rate. For the selective equalization scheme, only equalizer coefficients $c_1(n)$ or $c_2(n)$ are non-zero, and only the on-time or late samples are filtered to generate the output samples $\hat{x}(n)$.

Figure 7:
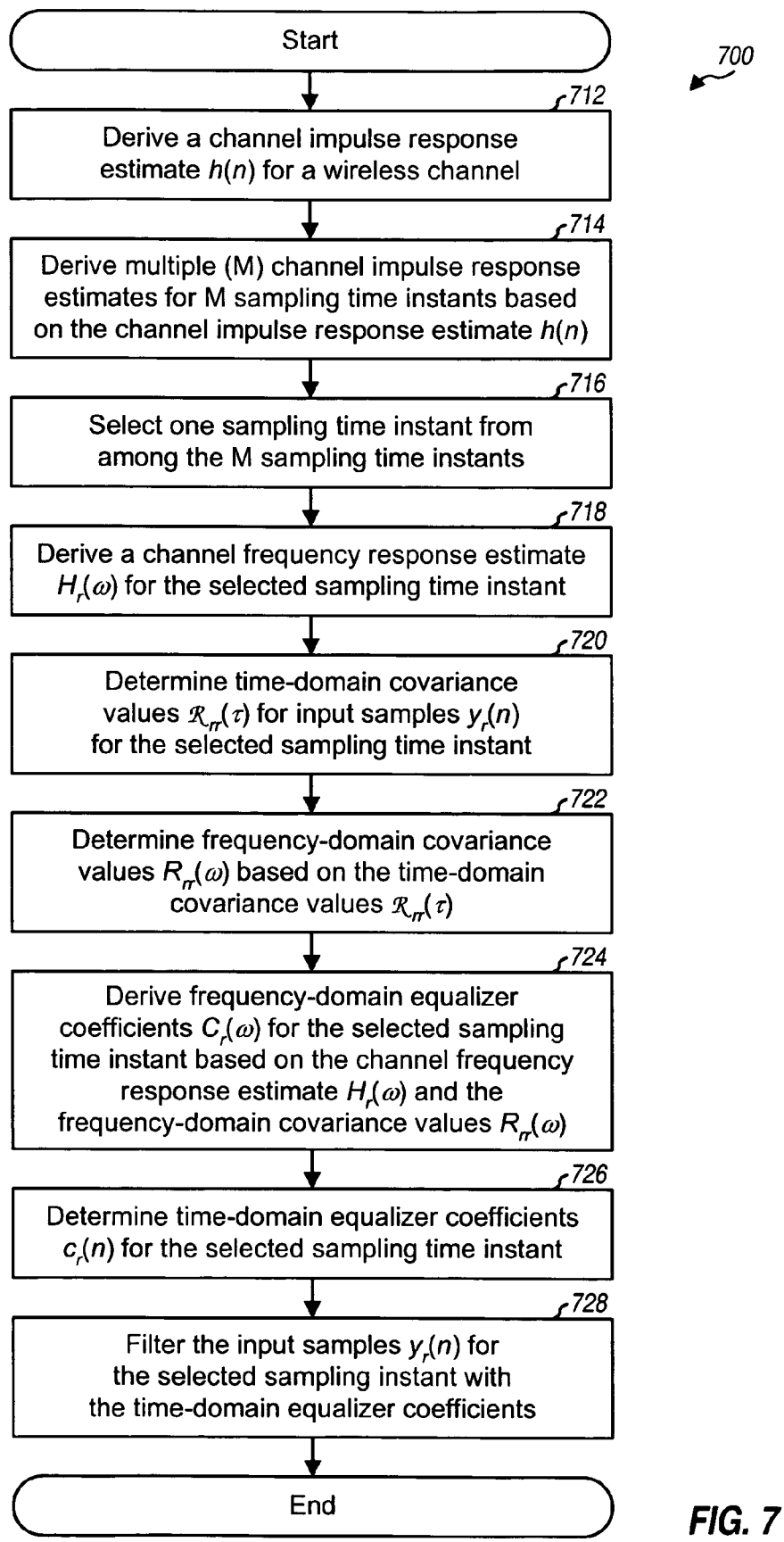
FIG. 7 shows a process for performing selective equalization.

FIG. 7 shows a process 700 for performing equalization selectively for the best branch. A channel impulse response estimate h(n) for a wireless channel is derived, e.g., based on a received pilot (block 712). Multiple (M) channel impulse response estimates $h_1(n)$ through $h_M(n)$ for M sampling time instants are derived based on (e.g., by sub-sampling) the channel impulse response estimate h(n) (block 714). M may be equal to two, as described above, or may be greater than two. The M sampling time instants correspond to M different branches. One sampling time instant is selected from among the M sampling time instants and denoted as sampling time instant r (block 716). The selection of the best sampling time instant may be achieved by computing the energy of the channel taps for each sampling time instant and comparing the energies for the M sampling time instants to determine the sampling time instant with the largest energy.

A channel frequency response estimate $H_r(\omega)$ for the selected sampling time instant is derived based on (e.g., by performing an FFT on) the channel impulse response estimate $h_r(n)$ for the selected sampling time instant (block 718). Time-domain covariance values $\mathcal{R}_{rr}(\tau)$ for input samples $y_r(n)$ for the selected sampling time instant are determined, e.g., as shown in equation (9) (block 720). Frequency-domain covariance values $R_{rr}(\omega)$ are determined based on (e.g., by performing an FFT on) the time-domain covariance values $\mathcal{R}_{rr}(\tau)$ (block 722). Frequency-domain equalizer coefficients $C_r(\omega)$ for the selected sampling time instant are then derived based on the channel frequency response estimate $H_r(\omega)$ and the frequency-domain covariance values $R_{rr}(\omega)$ (block 724). The equalizer coefficients may be computed based on the LMMSE technique, as shown in equation (12), or based on some other equalization technique. Time-domain equalizer coefficients $c_r(n)$ for the selected sampling time instant are determined based on (e.g., by performing an IFFT on) the frequency-domain equalizer coefficients $C_r(\omega)$ (block 726). The input samples $y_r(n)$ for the selected sampling time instant are filtered with the time-domain equalizer coefficients $c_r(n)$ (block 728).

Figure 8A:
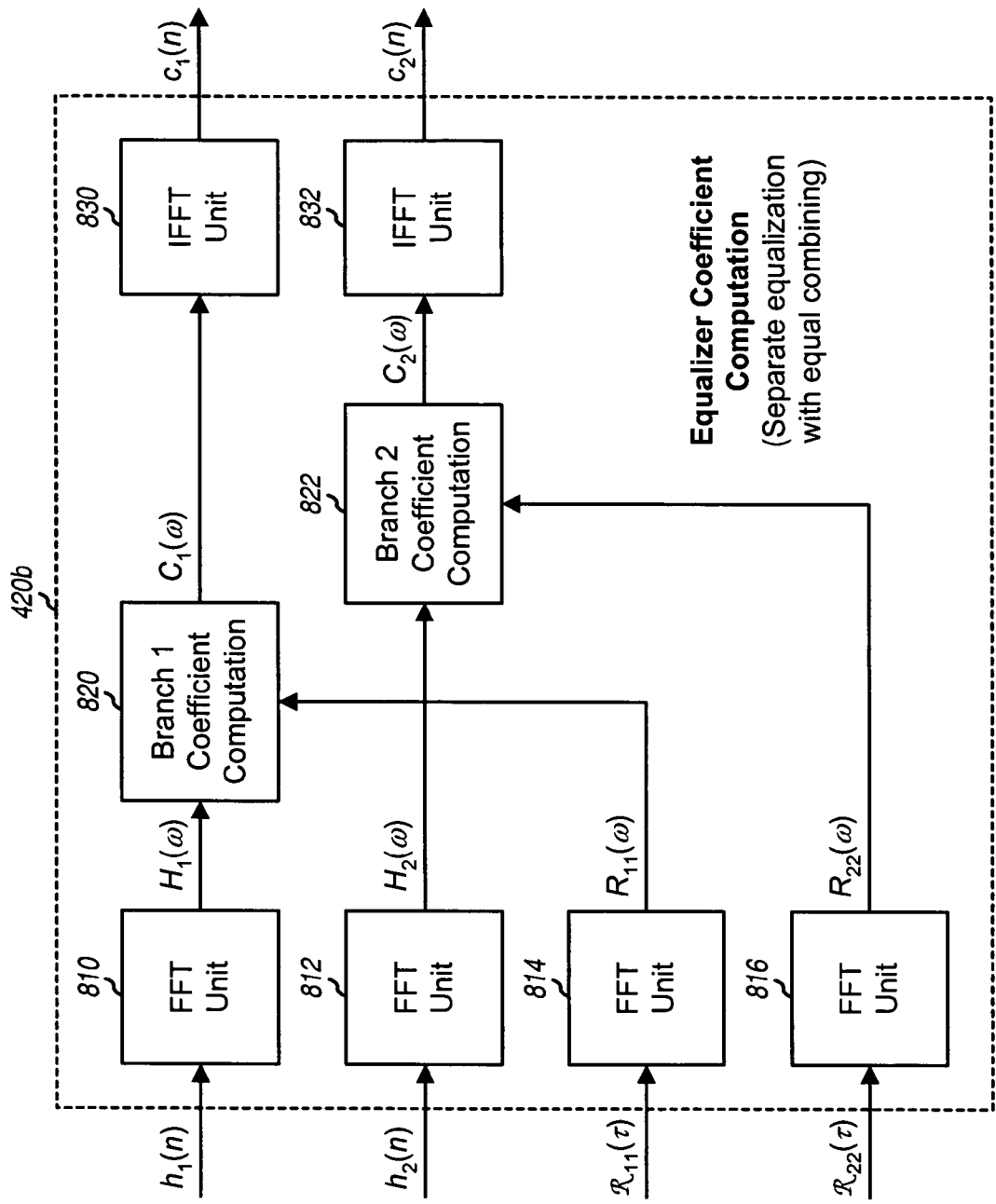
FIGS. 8A and 8B show computation units for separate equalization with equal and weighted combining, respectively.

FIG. 8A shows a block diagram of an equalizer coefficient computation unit 420b for the separate equalization with combining scheme. Computation unit 420b performs equal combining of the two branches and is another embodiment of computation unit 420 in FIG. 4.

Within unit 420b, an FFT unit 810 transforms the on-time channel taps $h_1(n)$ with an L-point FFT and provides L channel gains $H_1(\omega)$ for branch 1. An FFT unit 812 transforms the late channel taps $h_2(n)$ with an L-point FFT and provides L channel gains $H_2(\omega)$ for branch 2. An FFT unit 814 performs an L-point FFT on time-domain covariance values $\mathcal{R}_{11}(\tau)$ for branch 1, which may be arranged as $\{\mathcal{R}_{11}(0), \ldots, \mathcal{R}_{11}(L/2-1), 0, \mathcal{R}_{11}^*(L/2-1), \ldots, \mathcal{R}_{11}^*(1)\}$, and provides L frequency-domain covariance values $R_{11}(\omega)$, for $\omega=1, \ldots, L$. An FFT unit 816 performs an L-point FFT on time-domain covariance values $\mathcal{R}_{22}(\tau)$ for branch 2, which may be arranged as $\{\mathcal{R}_{22}(0), \ldots, \mathcal{R}_{22}(L/2-1), 0, \mathcal{R}_{22}^*(L/2-1), \ldots, \mathcal{R}_{22}^*(1)\}$, and provides L covariance values $R_{22}(6)$), for $\omega=1, \ldots, L$.

A computation unit 820 computes frequency-domain equalizer coefficients $C_1(\omega)$ for branch 1 based on the channel gains $H_1(\omega)$ and the covariance values $R_{11}(\omega)$ for branch 1, e.g., as shown in equation (12). Similarly, a computation unit 822 computes frequency-domain equalizer coefficients $C_2(\omega)$ for branch 2 based on the channel gains $H_2(\omega)$ and the covariance values $R_{22}(\omega)$ for branch 2. An IFFT unit 830 performs an L-point IFFT on the L frequency-domain equalizer coefficients $C_1(\omega)$ and provides L time-domain equalizer coefficients $c_1(n)$ for branch 1. An IFFT unit 832 performs an L-point IFFT on the L frequency-domain equalizer coefficients $C_2(\omega)$ and provides L time-domain equalizer coefficients $c_2(n)$ for branch 2. The equalizer coefficients $c_1(n)$ and $c_2(n)$ are used to filter the on-time samples $y_1(n)$ and the late samples $c_2(n)$, as shown in equation (14).

Figure 8B:
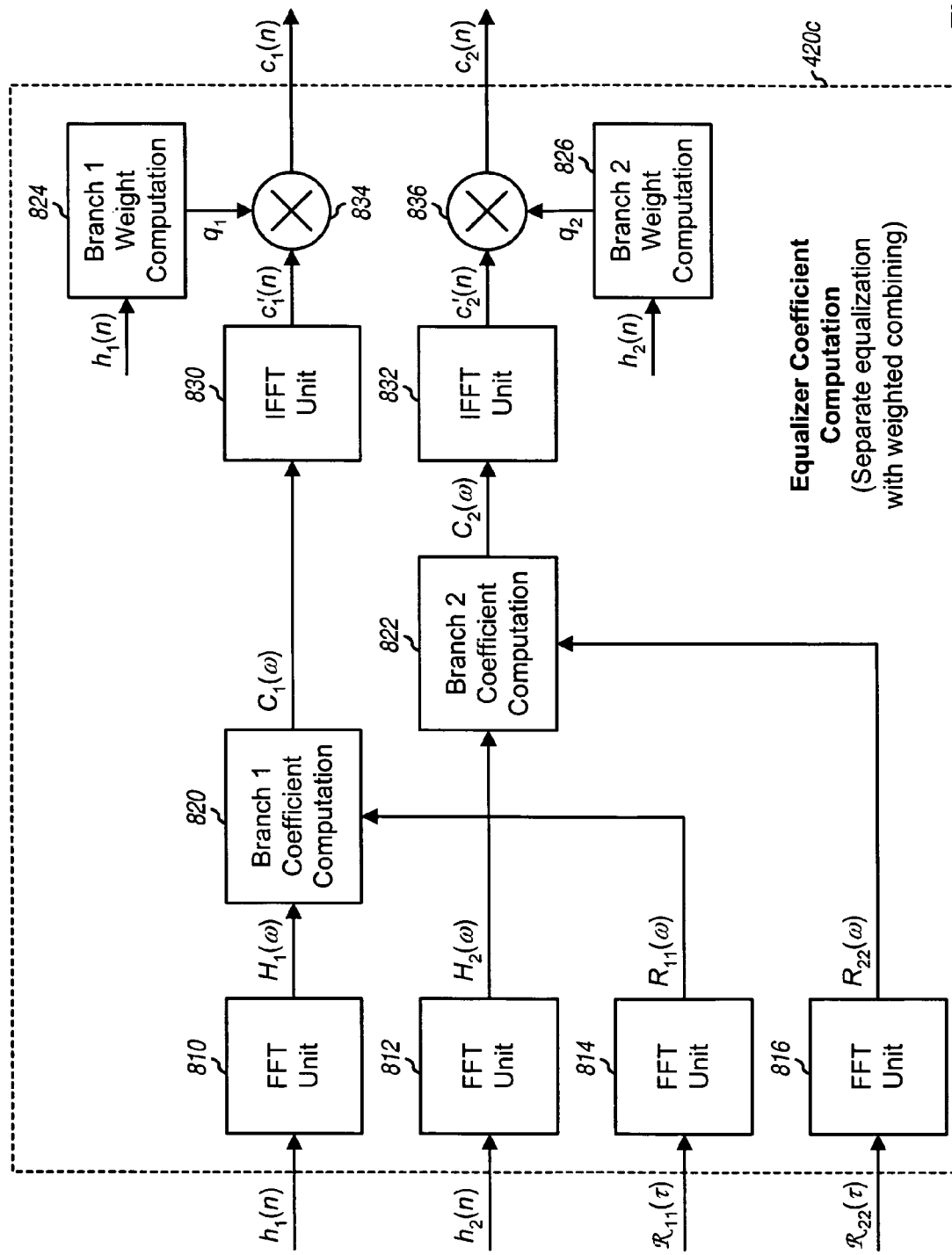

FIG. 8B shows a block diagram of an equalizer coefficient computation unit 420c for the separate equalization with combining scheme. Computation unit 420c performs weighted combining of the two branches and is yet another embodiment of computation unit 420 in FIG. 4. Computation unit 420c includes FFT units 810, 812, 814 and 816, coefficient computation units 820 and 822, and IFFT units 830 and 832 that operate as described above for FIG. 8A. Computation unit 420c further includes weight computation units 824 and 826 and multipliers 834 and 836.

Unit 824 receives the on-time channel taps $h_1(n)$ and computes the weight for branch 1. Unit 826 receives the late channel taps $h_2(n)$ and computes the weight for branch 2. The weight $q_m$ for each branch m may be computed as follows:

$$q_m = \sqrt{\|h_m(n)\|^2} \qquad \text{Eq (15)}$$
$$= \left(\sum_{n=1}^{L} |h_m(n)|^2\right)^{1/2},$$
$$\text{for } m = 1, 2.$$

In equation (15), the scaling by L is omitted since both branches are affected by the same scaling.

The coefficients for each branch are scaled by the weight for that branch. For the embodiment shown in FIG. 8B, the scaling is performed on the time-domain equalizer coefficients. Multiplier 834 is located after IFFT unit 830, scales each time-domain equalizer coefficient $c_1'(n)$ from FFT unit 830 with the weight $q_1$ for branch 1, and provides L output equalizer coefficients $c_1(n)$ for branch 1. Similarly, multiplier 836 is located after IFFT unit 832, scales each time-domain coefficient $c_2'(n)$ from FFT unit 832 with the weight $q_2$ for branch 2, and provides L output equalizer coefficients $c_2(n)$ for branch 2. In another embodiment, which is not shown in FIG. 8B, the scaling is performed on the frequency-domain equalizer coefficients $C_m(\omega)$. For this embodiment, multipliers 834 and 836 would be located after computation units 820 and 822, respectively.

Figure 9:
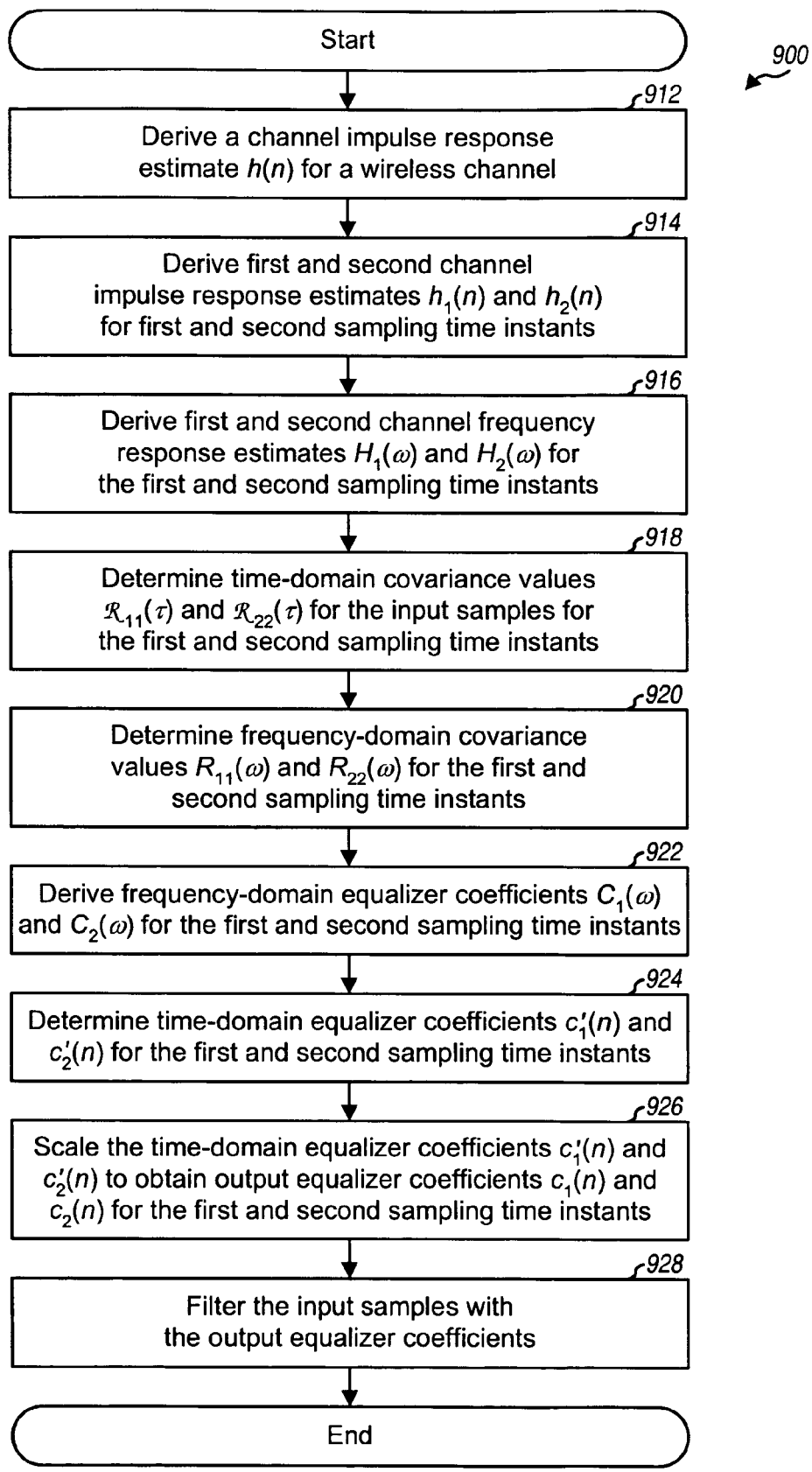
FIG. 9 shows a process for performing separate equalization with combining.

FIG. 9 shows a process 900 for performing equalization separately for each branch and combining the results. A channel impulse response estimate $h_1(n)$ for a wireless channel is derived, e.g., based on a received pilot (block 912). A first channel impulse response estimate $h_1(n)$ for a first sampling time instant and a second channel impulse response estimate $h_2(n)$ for a second sampling time instant are derived based on (e.g., by sub-sampling) the channel impulse response estimate $h(n)$ (block 914). A first channel frequency response estimate $H_1(\omega)$ for the first sampling time instant is derived based on (e.g., by performing an FFT on) the first channel impulse response estimate $h_1(n)$ (block 916). A second channel frequency response estimate $H_2(\omega)$ for the second sampling time instant is derived based on the second channel impulse response estimate $h_2(n)$ (also block 916). Time-domain covariance values $\mathcal{R}_{11}(\tau)$ for input samples $y_1(n)$ for the first sampling time instant and time-domain covariance values $\mathcal{R}_{22}(\tau)$ for input samples $y_2(n)$ for the second sampling time instant are determined (block 918). Frequency-domain covariance values $R_{11}(\omega)$ for the first sampling time instant are determined based on (e.g., by performing an FFT on) the time-domain covariance values $\mathcal{R}_{11}(\tau)$ (block 920). Frequency-domain covariance values $R_{22}(\omega)$ for the second sampling time instant are determined based on the time-domain covariance values $\mathcal{R}_{22}(\tau)$ (also block 920). Frequency-domain equalizer coefficients $C_1(\omega)$ for the first sampling time instant are derived based on the channel frequency response estimate $H_1(\omega)$ and the frequency-domain covariance values $R_{11}(\omega)$ (block 922). Frequency-domain equalizer coefficients $C_2(\omega)$ for the second sampling time instant are derived based on the channel frequency response estimate $H_2(\omega)$ and the frequency-domain covariance values $R_{22}(\omega)$ (also block 922). The equalizer coefficients may be computed based on the LMMSE technique, as shown in equation (12), or based on some other equalization technique.

Time-domain equalizer coefficients $c_1'(n)$ for the first sampling time instant are determined based on (e.g., by performing an IFFT on) the frequency-domain equalizer coefficients $C_1(\omega)$ (block 924). Time-domain equalizer coefficients $c_2'(n)$ for the second sampling time instant are determined based on the frequency-domain equalizer coefficients $C_2(\omega)$ (also block 924). The time-domain equalizer coefficients $c_1'(n)$ for the first sampling time instant are scaled by a first weight $q_1$ to obtain output equalizer coefficient $c_1(n)$ (block 926). The time-domain equalizer coefficients $c_2'(n)$ for the second sampling time instant are scaled by a second weight $q_2$ to obtain output equalizer coefficient $c_2(n)$ (also block 926). The first and second weights may be equal or may be derived based on the energies of $h_1(n)$ and $h_2(n)$, respectively. The input samples are filtered with the output equalizer coefficients $c_1(n)$ and $c_2(n)$ (block 928).

Figure 10:
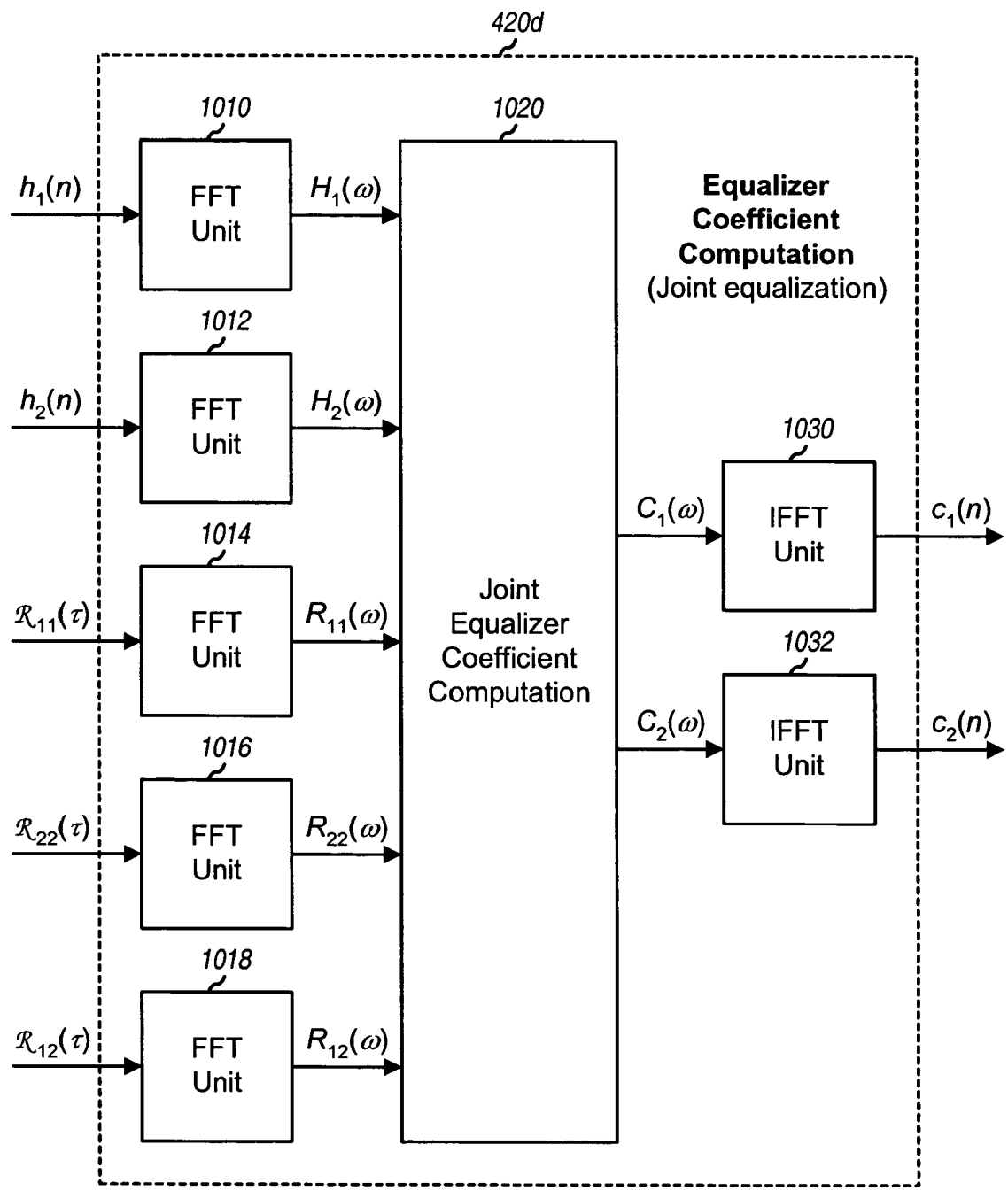
FIG. 10 shows a computation unit for joint equalization.

FIG. 10 shows a block diagram of an equalizer coefficient computation unit 420d for the joint equalization scheme. Computation unit 420d is yet another embodiment of computation unit 420 in FIG. 4.

Within unit 420d, an FFT unit 1010 transforms the on-time channel taps $h_1(n)$ and provides L channel gains $H_1(\omega)$ for branch 1. An FFT unit 1012 transforms the late channel taps $h_2(n)$ and provides L channel gains $H_2(\omega)$ for branch 2. An FFT unit 1014 performs an L-point FFT on time-domain covariance values $R_{11}(\tau)$, which may be arranged as $\{\mathcal{R}_{11}(0), \ldots, \mathcal{R}_{11}(L/2-1), 0, \mathcal{R}_{11}^*(L/2-1), \ldots, \mathcal{R}_{11}^*(1)\}$, and provides L frequency-domain covariance values $R_{11}(\omega)$, for $\omega=1, \ldots, L$. An FFT unit 1016 performs an L-point FFT on time-domain covariance values $R_{22}(\tau)$, which may be arranged as $\{\mathcal{R}_{22}(0), \ldots, \mathcal{R}_{22}^*(L/2-1), 0, \mathcal{R}_{22}^*(L/2-1), \ldots, \mathcal{R}^*_{22}(1)\}$, and provides L covariance values $R_{22}(\omega)$, for $\omega=1, \ldots, L$. An FFT unit 1018 performs an L-point FFT on L time-domain covariance values $R_{12}(\tau)$, which may be arranged as $\{\mathcal{R}_{12}(0), \ldots, \mathcal{R}_{12}(L/2-1), 0, \mathcal{R}_{22}(-L/2+1), \ldots, \mathcal{R}_{22}(-1)\}$, and provides L covariance values $R_{12}(\omega)$, for $\omega=1, \ldots, L$.

A computation unit 1020 jointly computes the frequency-domain equalizer coefficients $C_1(\omega)$ and $C_2(\omega)$ for branches 1 and 2, as described below. An IFFT unit 1030 transforms the frequency-domain equalizer coefficients $C_1(\omega)$ and provides time-domain equalizer coefficients $c_1(n)$ for branch 1. An IFFT unit 1032 transforms the frequency-domain equalizer coefficients $C_2(\omega)$ and provides time-domain equalizer coefficients $c_2(n)$ for branch 2.

For the joint equalization scheme, the on-time and late samples $y_1(n)$ and $y_2(n)$ are equalized with two sets of equalizer coefficients $c_1(n)$ and $c_2(n)$ that are derived jointly such that the output samples $\hat{x}(n)$ in equation (14) provide the best linear approximation of $x(n)$ in the mean square error sense. The LMMSE solutions for the two sets of equalizer coefficients may be expressed in the frequency domain, as follows:

$$\begin{bmatrix} C_1(\omega) \\ C_2(\omega) \end{bmatrix} = \begin{bmatrix} R_{11}(\omega) & R_{12}(\omega) \\ R_{21}(\omega) & R_{22}(\omega) \end{bmatrix}^{-1} \cdot \begin{bmatrix} H_1^*(\omega) \\ H_2^*(\omega) \end{bmatrix}. \quad \text{Eq (16)}$$

Since $R_{21}(\omega) = R_{12}^*(\omega)$, it is sufficient to estimate just $R_{11}(\tau)$, $R_{22}(\tau)$ and $R_{12}(\tau)$.

In equation (16), L 2×2 matrices are formed for $\omega = 1, \ldots, L$. Each 2×2 matrix may be inverted and used to derive the equalizer coefficients $C_1(\omega)$ and $C_2(\omega)$ for one frequency bin $\omega$. A given 2×2 matrix may be poorly conditioned, e.g., close to singular because of estimation errors. The inversion of a poorly conditioned matrix may produce a large entry that may excessively enhance noise. Several techniques may be used to deal with poorly conditioned matrices.

In a first embodiment, the joint processing of the two branches is performed with "diagonal" conditioning. For this embodiment, the time-domain covariance values for branches 1 and 2 are conditioned by setting $\mathcal{R}_{11}(0) = \beta \cdot \mathcal{R}_{11}(0)$ and $\mathcal{R}_{22}(0) = \beta \cdot \mathcal{R}_{22}(0)$, where $\beta > 1.0$ and may be selected as, e.g., $\beta = 1.05$. This scaling for a single tap of $\mathcal{R}_{mm}(\tau)$ introduces a small spectral component in each frequency bin of $R_{mm}(\omega)$, which makes the frequency domain matrices "more invertible". FFTs are then performed on the conditioned $\mathcal{R}_{11}(\tau)$ and $\mathcal{R}_{22}(\tau)$.

Computation unit 1020 may then compute the frequency-domain equalizer coefficients $C_1(\omega)$ and $C_2(\omega)$ for branches 1 and 2, respectively, as follows:

$$\begin{bmatrix} C_1(\omega) \\ C_2(\omega) \end{bmatrix} = \quad \text{Eq (17)}$$
$$\frac{1}{R_{11}(\omega)R_{22}(\omega) - |R_{12}(\omega)|^2} \cdot \begin{bmatrix} R_{22}(\omega) & -R_{12}^*(\omega) \\ -R_{12}(\omega) & R_{11}(\omega) \end{bmatrix} \cdot \begin{bmatrix} H_1^*(\omega) \\ H_2^*(\omega) \end{bmatrix}.$$

The scaling of $\mathcal{R}_{11}(0)$ and $\mathcal{R}_{22}(0)$ by $\beta$ results in a small amount of distortion that is negligible.

In a second embodiment, the joint processing of the two branches is performed with "pseudo-inverse" conditioning. For this embodiment, the equalizer coefficients $C_1(\omega)$ and $C_2(\omega)$ for each frequency bin $\omega$ may be computed in one of several manners depending on whether or not the 2×2 matrix for that frequency bin is poorly conditioned.

For each frequency bin $\omega$, the following condition is determined:

$$R_{11}(\omega)R_{22}(\omega) - |R_{12}(\omega)|^2 \geq 0.05 \cdot [R_{11}(\omega) + R_{22}(\omega)]^2. \quad \text{Eq (18)}$$

Equation (18) checks if a "condition number" of the 2×2 matrix for frequency bin $\omega$ is below a certain value. This condition may be used to determine whether or not the 2×2 matrix is poorly conditioned.

For each frequency bin $\omega$ in which the 2×2 matrix is not poorly conditioned, which is indicated by the condition in equation (18) holding, the frequency-domain equalizer coefficients $C_1(\omega)$ and $C_2(\omega)$ for that frequency bin may be computed as shown in equation (17).

For each frequency bin $\omega$ in which the 2×2 matrix is poorly conditioned, which is indicated by the condition in equation (18) not holding, the frequency-domain equalizer coefficients $C_1(\omega)$ and $C_2(\omega)$ for that frequency bin may be computed as follows. The following quantities are computed for frequency bin $\omega$:

$$\lambda_{max}(\omega) = \quad \text{Eq (19)}$$
$$R_{11}(\omega) + R_{22}(\omega) + 0.5 \cdot \sqrt{[R_{11}(\omega) - R_{22}(\omega)]^2 + 4R_{12}^2(\omega)},$$

$$\upsilon(\omega) = \frac{\lambda_{max}(\omega) - R_{11}(\omega)}{R_{12}^*(\omega)}, \quad \text{Eq (20)}$$

where $\lambda_{max}(\omega)$ is the largest eigenvalue of the 2×2 matrix for frequency bin $\omega$, and
$\upsilon(\omega)$ is a component of an eigenvector $[1 \; \upsilon(\omega)]^T$ of the 2×2 matrix.

The frequency-domain equalizer coefficients $C_1(\omega)$ and $C_2(\omega)$ for frequency bin $\omega$ may then be computed as follows:

$$\begin{bmatrix} C_1(\omega) \\ C_2(\omega) \end{bmatrix} = \frac{1}{\lambda_{max}(\omega) \cdot (1 + |\upsilon(\omega)|^2)} \cdot \begin{bmatrix} 1 & \upsilon(\omega) \\ \upsilon^*(\omega) & |\upsilon(\omega)|^2 \end{bmatrix} \cdot \begin{bmatrix} H_1^*(\omega) \\ H_2^*(\omega) \end{bmatrix}. \quad \text{Eq (21)}$$

Equation (21) essentially nulls out the smaller eigenvalue of the 2×2 matrix and takes the pseudo-inverse of the resultant matrix.

Equation (21) may be approximated as follows:

$$\begin{bmatrix} C_1(\omega) \\ C_2(\omega) \end{bmatrix} = \frac{1}{[R_{11}(\omega) + R_{22}(\omega)]^2} \cdot \begin{bmatrix} R_{11}(\omega) & R_{12}(\omega) \\ R_{12}^*(\omega) & R_{22}(\omega) \end{bmatrix} \cdot \begin{bmatrix} H_1^*(\omega) \\ H_2^*(\omega) \end{bmatrix}. \quad \text{Eq (22)}$$

Equation (21) may also be approximated as follows:

$$\begin{bmatrix} C_1(\omega) \\ C_2(\omega) \end{bmatrix} = \quad \text{Eq (23)}$$
$$A(\omega) \cdot \begin{bmatrix} |R_{12}(\omega)|^2 & R_{22}(\omega) \cdot R_{12}^*(\omega) \\ R_{22}(\omega) \cdot R_{12}(\omega) & R_{22}^2(\omega) \end{bmatrix} \cdot \begin{bmatrix} H_1^*(\omega) \\ H_2^*(\omega) \end{bmatrix},$$

where $$A(\omega) = \frac{1}{[R_{11}(\omega) + R_{22}(\omega)] \cdot [R_{22}^2(\omega) + R_{12}^2(\omega)]}.$$

Figure 11:
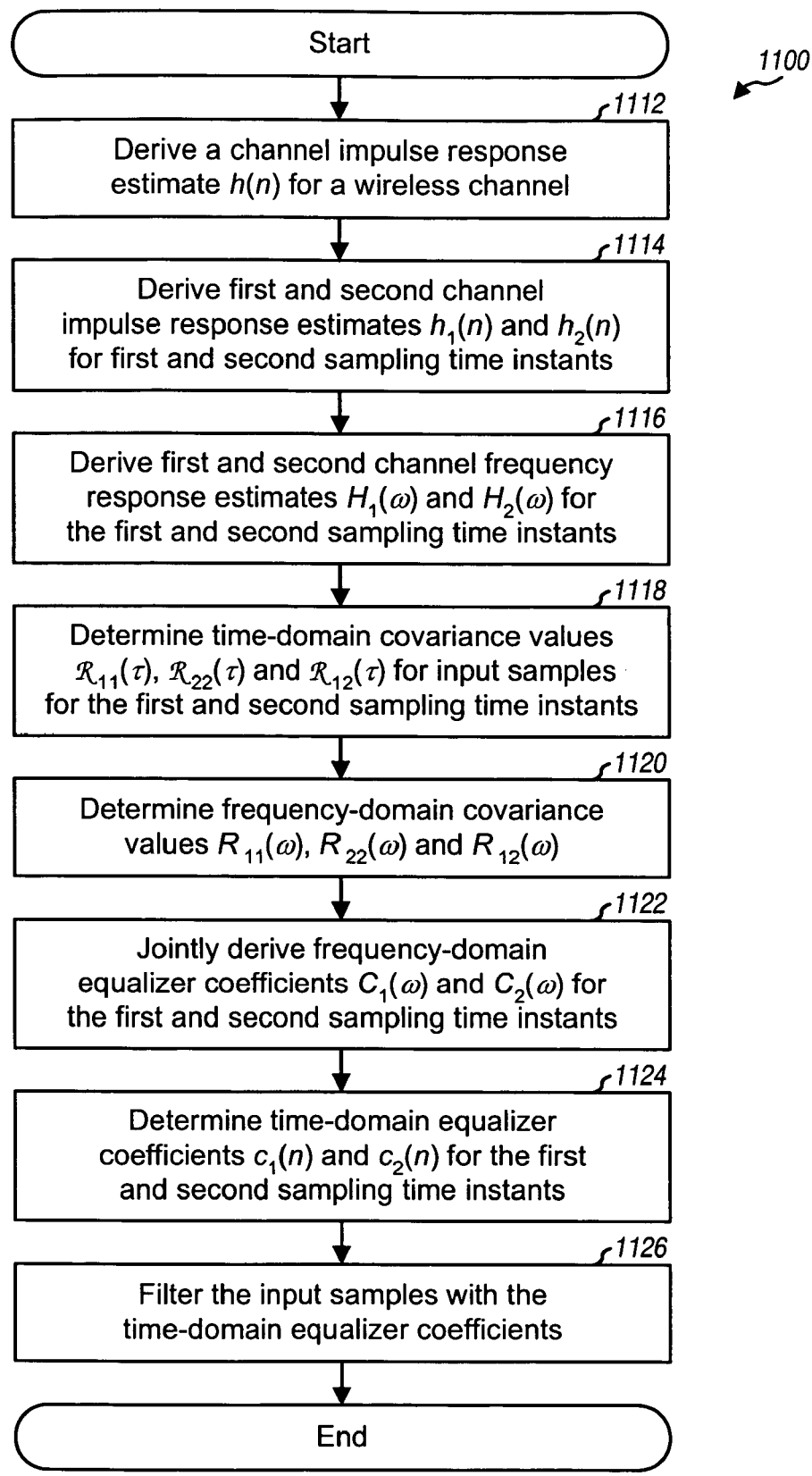
FIG. 11 shows a process for performing joint equalization.

FIG. 11 shows a process 1100 for performing equalization jointly for multiple branches. A channel impulse response estimate h(n) for a wireless channel is derived, e.g., based on a received pilot (block 1112. First and second channel impulse response estimates $h_1(n)$ and $h_2(n)$ for first and second sampling time instants, respectively, are derived based on (e.g., by sub-sampling) the channel impulse response estimate h(n) (block 1114). First and second channel frequency response estimates $H_1(\omega)$ and $H_2(\omega)$ for the first and second sampling time instants are derived based on the first and second channel impulse response estimates $h_1(n)$ and $h_2(n)$, respectively (block 1116). Time-domain covariance values $\mathcal{R}_{11}(\tau)$, $\mathcal{R}_{22}(\tau)$ and $\mathcal{R}_{12}(\tau)$ for input samples $y_1(n)$ and $y_2(n)$ for the first and second sampling time instants are determined (block 1118). Frequency-domain covariance values $R_{11}(\omega)$, $R_{22}(\omega)$ and $R_{12}(\omega)$ are determined based on the time-domain covariance values $\mathcal{R}_{11}(\tau)$, $\mathcal{R}_{22}(\tau)$ and $\mathcal{R}_{12}(\tau)$, respectively (block 1120).

Frequency-domain equalizer coefficients $C_1(\omega)$ and $C_2(\omega)$ for the first and second sampling time instants are derived jointly based on the first and second channel frequency response estimates $H_1(\omega)$ and $H_2(\omega)$ and the frequency-domain covariance values $R_{11}(\omega)$, $R_{22}(\omega)$ and $R_{12}(\omega)$ (block 1122). The equalizer coefficients may be computed based on the LMMSE technique, as shown in equations (16) through (23), or based on some other equalization technique. Time-domain equalizer coefficients $c_1(n)$ and $c_2(n)$ for the first and second sampling time instants are determined based on the frequency-domain equalizer coefficients $C_1(\omega)$ and $C_2(\omega)$, respectively (block 1124). The input samples are then filtered with the time-domain equalizer coefficients $c_1(n)$ and $c_2(n)$ (block 1126).

Figure 12:
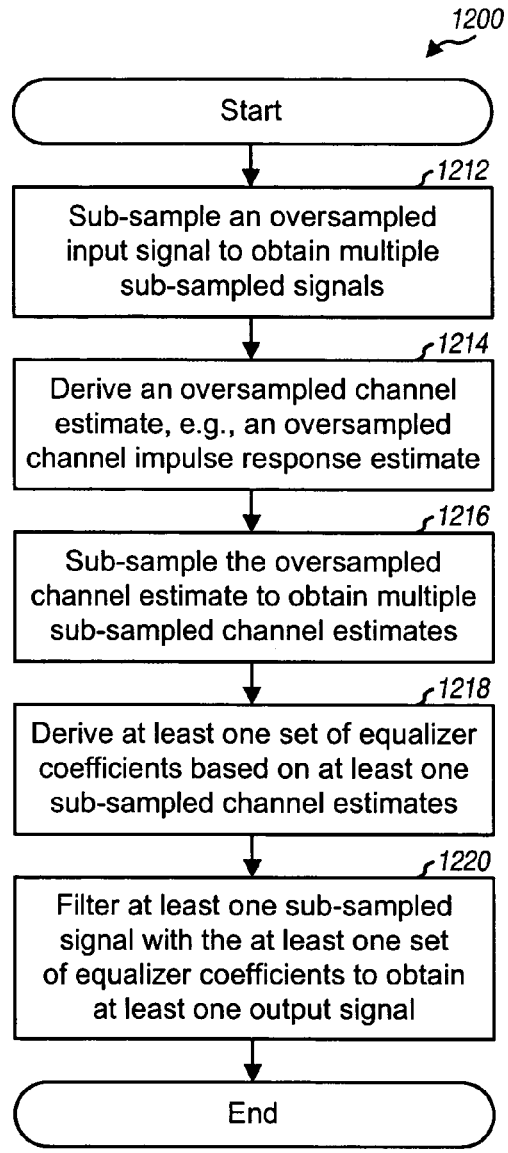
FIG. 12 shows a process for performing equalization with sub-sampling.

FIG. 12 shows a process 1200 for performing equalization on an over-sampled input signal with sub-sampling. The over-sampled input signal is sub-sampled or demultiplexed to obtain multiple sub-sampled signals (block 1212). An over-sampled channel estimate is derived, e.g., based on a received pilot (block 1214). The over-sampled channel estimate may be a channel impulse response estimate that is over-sampled in time, a channel frequency response estimate that is over-sampled in frequency, and so on. The over-sampled channel estimate is sub-sampled to obtain multiple sub-sampled channel estimates (block 1216). Equalization is performed on the multiple sub-sampled signals with the multiple sub-sampled channel estimates to obtain at least one output signal. For the equalization, at least one set of equalizer coefficients may be derived based on at least one sub-sampled channel estimate using any of the equalization schemes described above (block 1218). The equalizer coefficients may be derived in the time domain or frequency domain. At least one sub-sampled signal is then filtered with the at least one set of equalizer coefficients to obtain the at least one output signal (block 1220).

Figure 13:
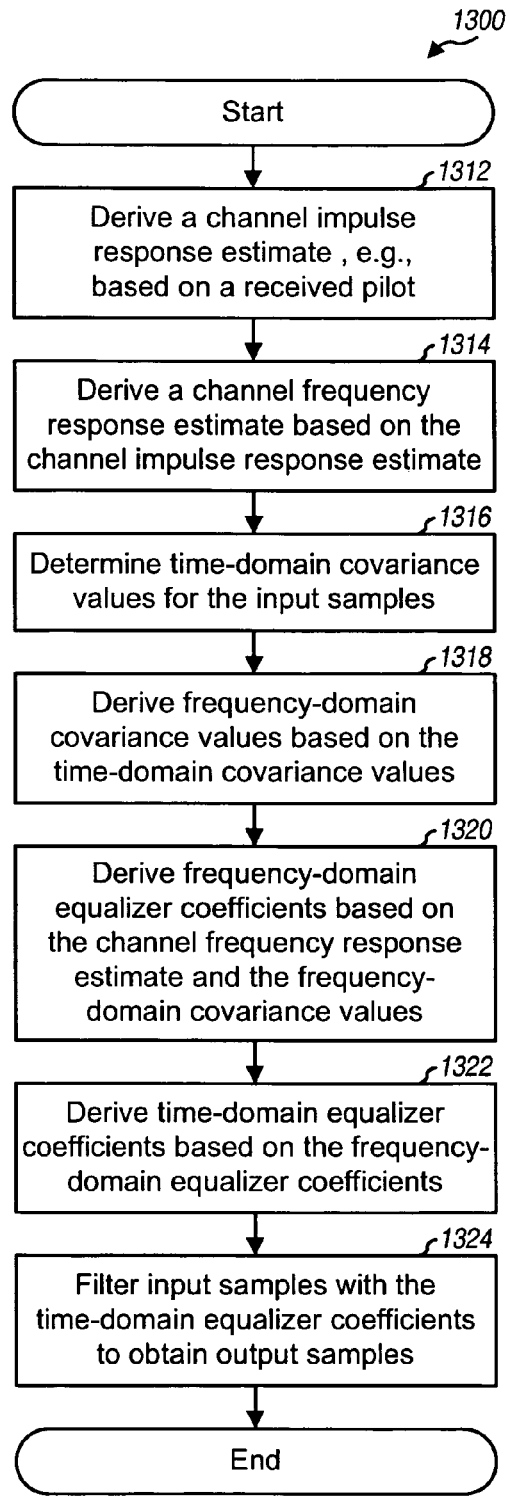
FIG. 13 shows a process for performing equalization with coefficients derived in the frequency domain

FIG. 13 shows a process 1300 for performing equalization on an over-sampled input signal with equalizer coefficients derived in the frequency domain. A channel impulse response estimate is derived, e.g., based on a received pilot (block 1312). A channel frequency response estimate is derived based on (e.g., by performing an FFT on) the channel impulse response estimate (block 1314). For an LMMSE filter, time-domain covariance values for the input samples may be determined (block 1316) and transformed to obtain frequency-domain covariance values (block 1318). Frequency-domain equalizer coefficients are derived for multiple frequency bins based on the channel frequency response estimate and the frequency-domain covariance values (block 1320). Time-domain equalizer coefficients are derived based on (e.g., by performing an IFFT on) the frequency-domain equalizer coefficients (block 1322). The input samples are then filtered with the time-domain equalizer coefficients to obtain output samples (block 1324).

For clarity, the equalization techniques have been described mostly for the case in which the input samples $y(n)$ are at Chip×2 and there are two branches corresponding to two sampling time instants. In general, the equalization techniques may be used for input samples that are over-sampled at multiple (M) times the chip rate, where $M \geq 2$. M branches may be formed for M sampling time instants. M sequences of input samples $y_1(n)$ through $y_M(n)$ for M sampling time instants may be obtained by sub-sampling or demultiplexing the over-sampled input samples $y(n)$. M channel impulse response estimates $h_1(n)$ through $h_M(n)$ for M sampling time instants may be obtained by sub-sampling or demultiplexing an over-sampled channel impulse response estimate $h(n)$ for the wireless channel. Covariance values $\mathcal{R}_{ij}(\tau)$, for $i,j \in \{1, \ldots, M\}$, may be derived based on the input samples $y(n)$, e.g., as shown in equation (9).

For the selective equalization scheme, the best branch may be selected, e.g., based on the energies of the channel impulse response estimates for the M branches. Equalizer coefficients for the best branch may be derived based on the channel impulse response estimate and the covariance values for that branch. The input samples for the best branch are filtered with the equalizer coefficients for that branch.

For the separate equalization with combining scheme, a set of equalizer coefficients may be derived for each branch based on the channel impulse response estimate and the covariance values for that branch. The M sets of equalizer coefficients for the M branches may be scaled with equal weights for all M branches or different weights determined based on the energies for the M branches. The input samples are filtered with the M sets of equalizer coefficients for the M branches.

For the joint equalization scheme, M sets of equalizer coefficients for the M branches may be derived jointly based on the channel impulse response estimates and the covariance values for all M branches. The input samples are filtered with the M sets of equalizer coefficients for the M branches.

The channel impulse response estimate $h(n)$, the covariance values $\mathcal{R}_{ij}(\tau)$, and the equalizer coefficients $c_m(n)$ may be updated at a sufficient rate to achieve good performance. For example, $h(n)$, $\mathcal{R}_{ij}(\tau)$ and $c_m(n)$ may be updated whenever a new pilot symbol is received, whenever a predetermined number of pilot symbols is received, in each slot, in each frame, and so on. For W-CDMA, a pilot symbol is sent in 256 chips, each slot spans 2560 chips or 10 pilot symbols, and each frame includes 15 slots. For cdma2000, a pilot symbol is sent in 128 chips, each slot spans 768 chips or 6 pilot symbols, and each frame includes 16 slots.

For clarity, the equalization techniques have been described for a transmitter with a single antenna and a receiver with a single antenna. These techniques may also be used for a transmitter with multiple antennas and for a receiver with multiple antennas, as described below.

Figure 14:
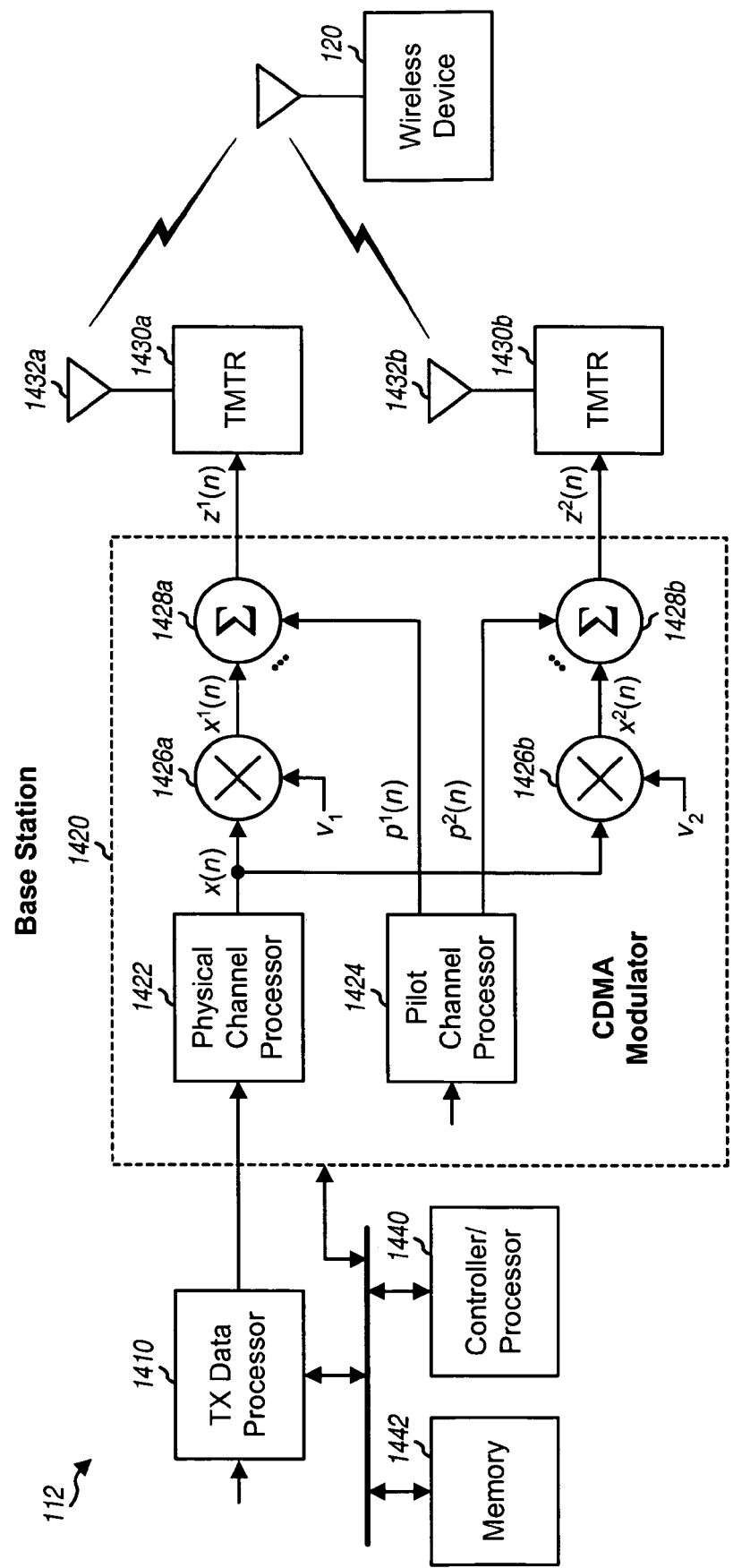
FIG. 14 shows a base station with multiple transmit antennas.

FIG. 14 shows a block diagram of a base station 112 with two transmit antennas 1432a and 1432b. Within base station 112, a TX data processor 1410 processes traffic data and generates data symbols. A CDMA modulator 1420 processes data and pilot symbols and generates output chips $z^1(n)$ and $z^2(n)$ for transmit antennas 1432a and 1432b, respectively.

Within CDMA modulator 1420, a physical channel processor 1422 processes data symbols for physical channel i and generates output chips $x(n)$ for this physical channel. A pilot channel processor 1424 generates output chips $p^1(n)$ and $p^2(n)$ for the pilot for transmit antennas 1432a and 1432b, respectively. Processors 1422 and 1424 may be implemented with processors 310 and 320, respectively, in FIG. 3. A multiplier 1426a scales the output chips $x(n)$ with a weight $v_1$ for transmit antenna 1432a and generates scaled output chips $x^1(n)$. A multiplier 1426b scales the output chips $x(n)$ with a weight $v_2$ for transmit antenna 1432b and generates scaled output chips $x^2(n)$. A summer 1428a sums the output chips for all physical channels for transmit antenna 1432a and provides output chips $z^1(n)$. A summer 1428b sums the output chips for all physical channels for transmit antenna 1432b and provides output chips $z^2(n)$. A transmitter 1430a processes the output chips $z^1(n)$ and generates a first RF signal, which is transmitted from antenna 1432a. A transmitter 1430b processes the output chips $z^2(n)$ and generates a second RF signal, which is transmitted from antenna 1432b. A controller/processor 1440 directs operation at base station 112. A memory 1442 stores data and program codes for base station 112.

For closed-loop transmit diversity (CLTD), the weights $v_1$ and $v_2$ may be selected by wireless device 120 and sent back to base station 112. The weights $v_1$ and $v_2$ may be selected to maximize the received signal at wireless device 120. In general, the weights $v_1$ and $v_2$ may be derived by the wireless device and/or the base station in various manners.

At wireless device 120, the input samples y(n) may be expressed as:

$$y(n) = [v_1 \cdot h^1(n) + v_2 \cdot h^2(n)] \otimes x(n) + w(n), \quad \text{Eq (24)}$$
$$= h_{eff}(n) \otimes x(n) + w(n),$$

where $h^1(n)$ is an impulse response from antenna 1432a to wireless device 120,
$h^2(n)$ is an impulse response from antenna 1432b to wireless device 120, and
$h_{eff}(n)=v_1 \cdot h^1(n)+v_2 \cdot h^2(n)$ is an effective impulse response for the wireless channel between base station 112 and wireless device 120.

A channel impulse response estimate $h^1(n)$ for transmit antenna 1432a may be derived based on the pilot $p^1(n)$ transmitted from this antenna. Similarly, a channel impulse response estimate $h^2(n)$ for transmit antenna 1432b may be derived based on the pilot $p^2(n)$ transmitted from this antenna. An effective channel impulse response estimate $h_{eff}(n)$ may then be derived based on $h^1(n)$ and $h^2(n)$ and the known weights $v_1$ and $v_2$. $h_{eff}(n)$ may also be derived in other manners.

The equalization techniques described above may be used with the effective channel impulse response estimate $h_{eff}(n)$ instead of h(n). In particular, $h_{eff}(n)$ may be sub-sampled to obtain effective channel impulse response estimates $h_{eff,1}(n)$ through $h_{eff,M}(n)$ for M branches corresponding to M sampling time instants. Equalization may be performed for the best branch, separately for the M branches and combined, or jointly for all M branches, as described above.

Figure 15:
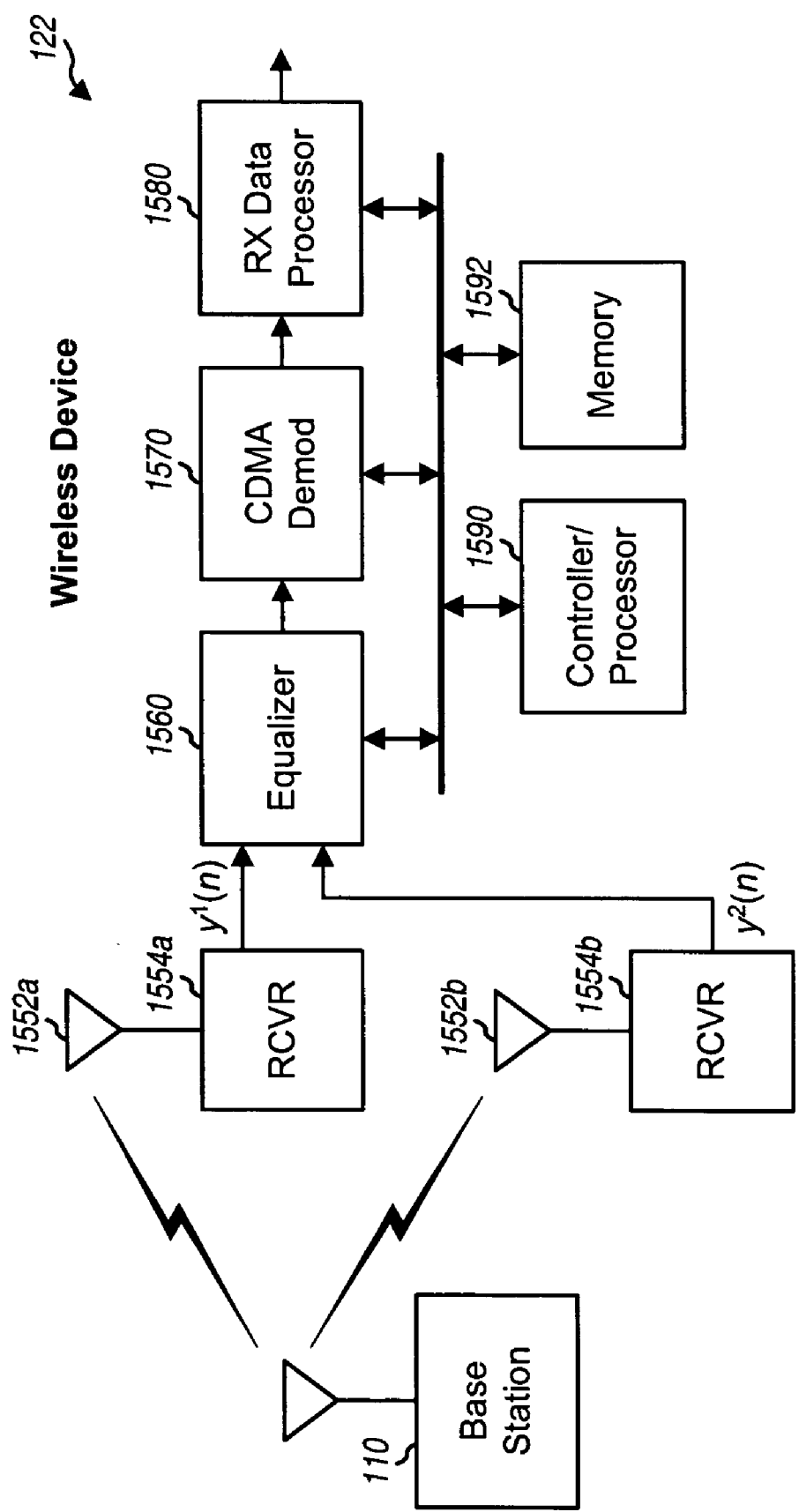
FIG. 15 shows a wireless device with multiple receive antennas.

FIG. 15 shows a block diagram of a wireless device 122 with two receive antennas 1552a and 1552b. At wireless device 122, a receiver 1554a processes a first received RF signal from antenna 1552a and provides input samples $y^1(n)$ for this antenna. A receiver 1554b processes a second received RF signal from antenna 1552b and provides input samples $y^2(n)$ for this antenna. An equalizer 1560 performs equalization on the input samples $y^1(n)$ and $y^2(n)$ as described below and provides output samples $\hat{x}(n)$. A CDMA demodulator 1570 processes the output samples and provides symbol estimates. An RX data processor 1580 processes the symbol estimates and provides decoded data. A controller/processor 1590 directs operation at wireless device 122. A memory 1592 stores data and program codes for wireless device 122.

At wireless device 122, the input samples $y^1(n)$ from receiver 1554a and the input samples $y^2(n)$ from receiver 1554b may be expressed as:

$$y^1(n)=h^1(n)\otimes x(n)+w^1(n), \text{ and}$$
$$y^2(n)=h^2(n)\otimes x(n)+w^2(n), \quad \text{Eq (25)}$$

where $h^1(n)$ is an impulse response from base station 110 to antenna 1552a,
$h^2(n)$ is an impulse response from base station 110 to antenna 1552b, and
$w^1(n)$ and $w^2(n)$ are the total noise for antennas 1552a and 1552b, respectively.

A channel impulse response estimate $h^1(n)$ for receive antenna 1552a may be derived based on the pilot received via this antenna. Similarly, a channel impulse response estimate $h^2(n)$ for receive antenna 1552b may be derived based on the pilot received via this antenna. The input samples $y^\alpha(n)$ for each receive antenna α may be sub-sampled to obtain input samples $y_1^\alpha(n)$ through $y_M^\alpha(n)$ for M branches for that antenna. If M=2, then the input samples for two branches for each receive antenna may be expressed as:

$$y_1^1(n)=h_1^1(n)\otimes x(n)+w_1^1(n),$$
$$y_2^1(n)=h_2^1(n)\otimes x(n)+w_2^1(n),$$
$$y_1^2(n)=h_1^2(n)\otimes x(n)+w_1^2(n), \text{ and}$$
$$y_2^2(n)=h_2^2(n)\otimes x(n)+w_2^2(n), \quad \text{Eq (26)}$$

where $y_1^1(n)$ and $y_2^1(n)$ are obtained by sub-sampling $y^1(n)$ for antenna 1552a,
$y_1^2(n)$ and $y_2^2(n)$ are obtained by sub-sampling $y^2(n)$ for antenna 1552b,
$h_1^1(n)$ and $h_2^1(n)$ are obtained by sub-sampling $h^1(n)$ for antenna 1552a, and
$h_1^2(n)$ and $h_2^2(n)$ are obtained by sub-sampling $h^2(n)$ for antenna 1552b.

The equalization techniques described above may be applied to the input samples $y_1^1(n)$, $y_2^1(n)$, $y_1^2(n)$ and $y_2^2(n)$ for four branches formed by two sampling time instants and two receive antennas. For the selective equalization scheme, the best branch having the largest energy among the four branches may be selected for equalization. For the separate equalization with combining scheme, equalization may be performed separately for four branches, for two best branches among the four branches, for the best branch for each receive antenna, and so on. The results for all selected branches may be combined to generate the output samples $\hat{x}(n)$. For the joint equalization scheme, equalization may be performed jointly for four branches, for two best branches among the four branches, for two best branches for the two receive antennas, and so on.

In an embodiment, the best branch is determined for each receive antenna, and equalization is performed for the two best branches for the two receive antennas. For this embodiment, the energy of each of the four branches may be determined, e.g., as shown in equation (10). For each receive antenna α, where $\alpha \in \{1, 2\}$, the branch with more energy is selected and denoted as r(α). Input samples $y_{r(1)}^1(n)$ and $y_{r(2)}^2(n)$ and channel impulse response estimates $h_{r(1)}^1(n)$ and $h_{r(2)}^2(n)$ may then be processed based on any of the equalization schemes described above to obtain the output samples $\hat{x}(n)$.

Figure 16:
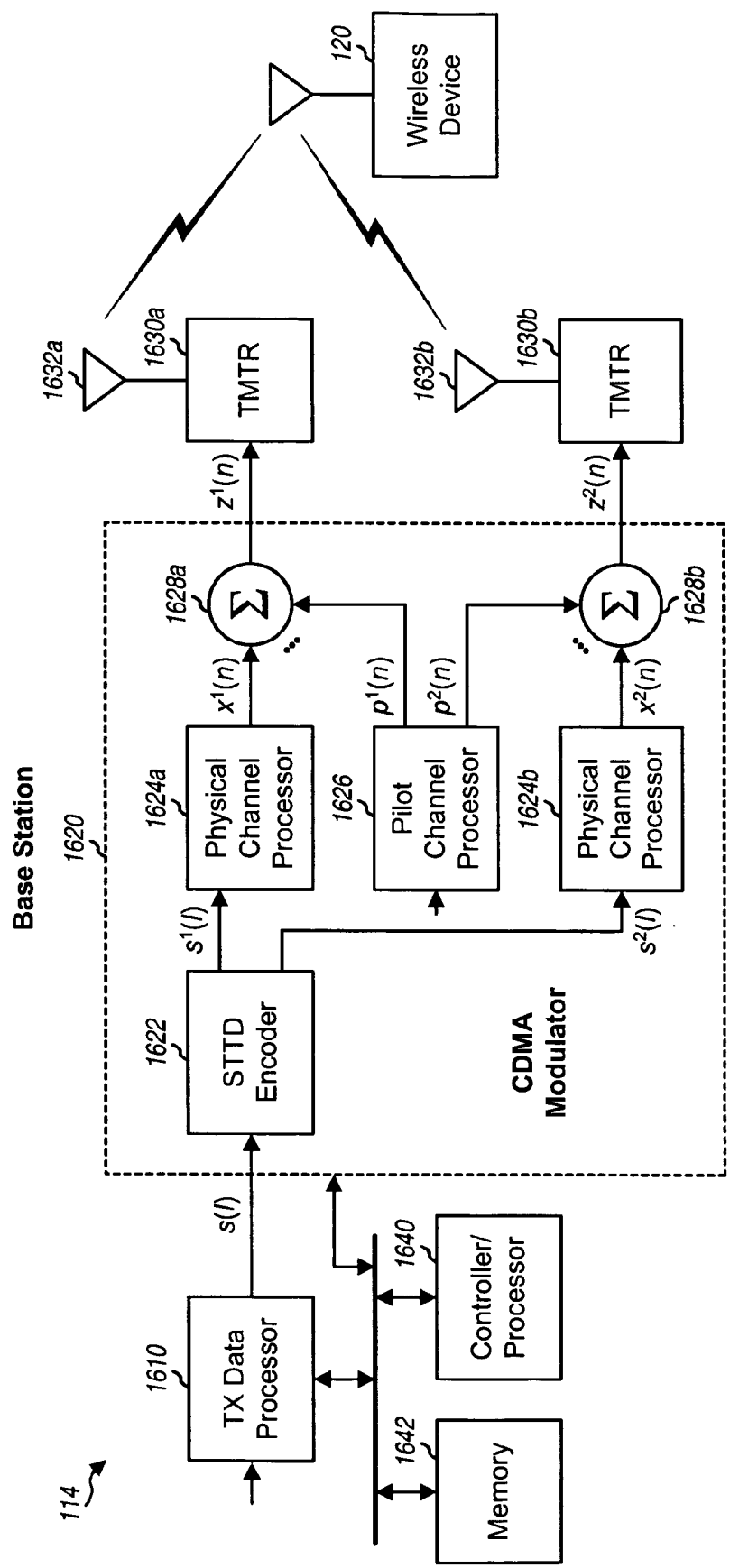
FIG. 16 shows a base station using space-time transmit diversity (STTD).

FIG. 16 shows a block diagram of a base station 114 using space-time transmit diversity (STTD). Within base station 114, a TX data processor 1610 processes traffic data and generates data symbols s(l). A CDMA modulator 1620 processes data and pilot symbols and generates output chips $z^1(n)$ and $z^2(n)$ for two transmit antennas 1632a and 1632b.

Within CDMA modulator 1620, an STTD encoder 1622 performs STTD encoding on data symbols s(l) and provides STTD encoded symbols $s^1(l)$ and $s^2(l)$ for transmit antennas 1632a and 1632b, respectively. If $s(l)=s_1, s_2, s_3, s_4, \ldots$, where $s_l$ is a data symbol for symbol period l, then $s^1(l)=s_1, s_2, s_3, s_4, \ldots$, and $s^2(l)=-s_2^*, s_1^*, -s_4^*, s_3^*, \ldots$. Physical channel processors 1624a and 1624b process STTD encoded symbols $s^1(l)$ and $s^2(l)$, respectively, and provide output chips $x^1(n)$ and $x^2(n)$, respectively. A pilot channel processor 1626 generates output chips $p^1(n)$ and $p^2(n)$ for the pilot for transmit antennas 1632a and 1632b, respectively. Processors 1624 and 1626 may be implemented with processors 310 and 320, respectively, in FIG. 3. Summers 1628a and 1628b sum the output chips for all physical channels for transmit antennas 1632a and 1632b, respectively, and provide output chips $z^1(n)$ and $z^2(n)$, respectively. Transmitters 1630a and 1630b process the output chips $z^1(n)$ and $z^2(n)$, respectively, and generate two RF signals that are transmitted from antennas 1632a and 1632b, respectively. A controller/processor 1640 directs operation at base station 114. A memory 1642 stores data and program codes for base station 114.

At wireless device 120, the input samples y(n) may be expressed as:

$$y(n) = h^1(n) \otimes x^1(n) + h^2(n) \otimes x^2(n) + w(n), \qquad \text{Eq (27)}$$

where $h^1(n)$ is an impulse response from antenna 1632a to wireless device 120, and $h^2(n)$ is an impulse response from antenna 1632b to wireless device 120.

A channel impulse response estimate $h^1(n)$ for transmit antenna 1632a may be derived based on the pilot $p^1(n)$ received from this antenna. A channel impulse response estimate $h^2(n)$ for transmit antenna 1632b may be derived based on the pilot $p^2(n)$ received from this antenna. If M=2, then $h^1(n)$ may be sub-sampled to obtain $h_1^1(n)$ and $h_2^1(n)$, $h^2(n)$ may be sub-sampled to obtain $h_1^2(n)$ and $h_2^2(n)$, and the input samples y(n) may be sub-sampled to obtain $y_1(n)$ and $y_2(n)$ for two branches. The desired signals $x^1(n)$ and $x^2(n)$ may be recovered in various manners.

In one embodiment, the desired signals $x^1(n)$ and $x^2(n)$ are recovered by performing equalization for the best sampling time instant. For this embodiment, the energy $E_1$ for the first sampling time instant is computed as $E_1 = \|h_1^1(n)\|^2 + \|h_1^2(n)\|^2$, the energy $E_2$ for the second sampling time instant is computed as $E_2 = \|h_2^1(n)\|^2 + \|h_2^2(n)\|^2$, and the sampling time instant r with the larger energy is selected. Equalizer coefficients $c_r^1(n)$ may be computed for transmit antenna 1632a and sampling time instant r based on $h_r^1(n)$ and possibly covariance values. Similarly, equalizer coefficients $c_r^2(n)$ may be computed for transmit antenna 1632b and sampling time instant r based on $h_r^2(n)$ and possibly covariance values.

Input samples $y_r(n)$ for sampling time instant r are then filtered with the equalizer coefficients $c_r^1(n)$ to obtain output samples $\hat{x}^1(n)$, which are estimates of output chips $x^1(n)$. The input samples $y_r(n)$ are also filtered with the equalizer coefficients $c_r^2(n)$ to obtain output samples $\hat{x}^2(n)$, which are estimates of output chips $\hat{x}^2(n)$. CDMA demodulation may then be performed on the output samples $\hat{x}^1(n)$ to obtain symbol estimates $\hat{s}^1(l)$, which are estimates of the STTD encoded symbols $s^1(l)$ transmitted from antenna 1632a. CDMA demodulation may also be performed on the output samples $\hat{x}^2(n)$ to obtain symbol estimates $\hat{s}^2(l)$, which are estimates of the STTD encoded symbols $s^2(l)$ transmitted from antenna 1632b. STTD decoding may then be performed on $\hat{s}^1(l)$ and $\hat{s}^2(l)$ to obtain symbol estimates $\hat{s}(l)$, which are estimates of data symbols s(l) for wireless device 120.

In another embodiment, $x^1(n)$ is recovered by treating $x^2(n)$ as noise, and $x^2(n)$ is recovered by treating $x^1(n)$ as noise. For this embodiment, the equalization to recover $x^b(n)$, for b∈{1, 2}, may be performed using any of the equalization schemes described above.

For clarity, the equalization techniques have been specifically described for an LMMSE filter and with the equalizer coefficients derived in the frequency domain. These techniques may also be used for other types of filters. In general, the equalizer coefficients may be derived in the time domain or frequency domain. Furthermore, the equalizer coefficients may be derived using various techniques such as LMMSE, least mean square (LMS), recursive least square (RLS), direct matrix inversion (DMI), zero-forcing, and other techniques. LMS, RLS, and DMI are described by Simon Haykin in a book entitled "Adaptive Filter Theory", 3rd edition, Prentice Hall, 1996.

The equalization techniques described herein may be implemented by various means. For example, these techniques may be implemented in hardware, firmware, software, or a combination thereof. For a hardware implementation, the processing units used to perform equalization may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the equalization techniques may be implemented with modules (e.g., procedures, functions, and so on) that perform the functions described herein. The firmware and/or software codes may be stored in a memory (e.g., memory 292 in FIG. 2) and executed by a processor (e.g., processor 290). The memory may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. An apparatus comprising:
    at least one processor configured to select a sampling time instant from among multiple sampling time instants of an input signal, to derive equalizer coefficients for the selected sampling time instant in accordance with sub-sampled impulse response channel estimates of the input signal and covariance values of subsampled input signal samples of input signal for the selected sampling time instant, and to filter input samples for the selected sampling time instant with the equalizer coefficients; and
    a memory coupled to the at least one processor.

2. The apparatus of claim 1, wherein the at least one processor is configured to determine energies of multiple channel impulse response estimates for the multiple sampling time instants, and to select the sampling time instant with a largest energy among the multiple sampling time instants.

3. The apparatus of claim 1, wherein the at least one processor is configured to derive a channel impulse response estimate for the selected sampling time instant, and to derive the equalizer coefficients based on the channel impulse response estimate.

4. The apparatus of claim 1, wherein the at least one processor is configured to derive a channel impulse response estimate for the selected sampling time instant, to determine covariance values for the input samples for the selected sampling time instant, and to derive the equalizer coefficients based on the channel impulse response estimate and the covariance values.

5. The apparatus of claim 1, wherein the at least one processor is configured to derive a channel impulse response estimate for the selected sampling time instant, to derive a channel frequency response estimate based on the channel impulse response estimate, to determine time-domain covariance values for the input samples for the selected sampling time instant, to determine frequency-domain covariance values based on the time-domain covariance values, to derive frequency-domain equalizer coefficients based on the channel frequency response estimate and the frequency-domain covariance values, and to derive time-domain equalizer coefficients based on the frequency-domain equalizer coefficients.

6. The apparatus of claim 1, wherein the at least one processor is configured to derive an effective channel impulse response estimate between multiple transmit antennas and at least one receive antenna for the selected sampling time instant, and to derive the equalizer coefficients based on the effective channel impulse response estimate.

7. The apparatus of claim 1, wherein the at least one processor is configured to derive the equalizer coefficients based on a linear minimum mean square error (LMMSE) technique.

8. The apparatus of claim 1, wherein the at least one processor is configured to receive input samples at multiple times chip rate, to demultiplex the input samples into multiple sequences for the multiple sampling time instants, one sequence for each sampling time instant, and to filter the sequence of input samples for the selected sampling time instant with the equalizer coefficients.

9. The apparatus of claim 1, wherein the multiple sampling time instants comprise first and second sampling time instants, and wherein the at least one processor is configured to receive input samples at twice chip rate, to demultiplex the input samples into on-time samples tor the first sampling time instant and late samples for the second sampling time instant, to select either the first or second sampling time instant, to filter the on-time samples with the equalizer coefficients if the first sampling time instant is selected, and to filter the late samples with the equalizer coefficients if the second sampling time instant is selected.

10. The apparatus of claim 1, wherein the at least one processor is further configured to filter input samples for the selected sampling time instant with the equalizer coefficients and with the subsampled input signal samples.

11. A method comprising:
selecting a sampling time instant from among multiple sampling time instants of an input signal;
deriving equalizer coefficients for the selected sampling time instant in accordance with subsampled impulse response channel estimates of the input signal and covariance values of subsampled input signal samples of the input signal for the selected sampling time instant; and
filtering input samples for the selected sampling time instant with the equalizer coefficients.

12. The method of claim 11, wherein the selecting the sampling time instant comprises
determining energies of multiple channel impulse response estimates for the multiple sampling time instants, and
selecting the sampling time instant with a largest energy among the multiple sampling time instants.

13. The method of claim 11, wherein the filtering the input samples comprises
receiving input samples at multiple times chip rate,
demultiplexing the input samples into multiple sequences for the multiple sampling time instants, one sequence for each sampling time instant, and
filtering the sequence of input samples for the selected sampling time instant with the equalizer coefficients.

14. The method of claim 11, wherein filtering input samples comprises filtering input samples for the selected sampling time instant with the equalizer coefficients and with the subsampled input signal samples.

15. An apparatus comprising:
means for selecting a sampling time instant from among multiple sampling time instants of an input signal;
means for deriving equalizer coefficients for the selected sampling time instant in accordance with subsampled impulse response channel estimates of the input signal and covariance values of subsampled input signal samples of the input signal for the selected sampling time instant; and
means for filtering input samples for the selected sampling time instant with the equalizer coefficients.

16. The apparatus of claim 15, wherein the means for selecting the sampling time instant comprises
means for determining energies of multiple channel impulse response estimates for the multiple sampling time instants, and
means for selecting the sampling time instant with a largest energy among the multiple sampling time instants.

17. The apparatus of claim 15, wherein the means for filtering the input samples comprises
means for receiving input samples at multiple times chip rate,
means for demultiplexing the input samples into multiple sequences for the multiple sampling time instants, one sequence for each sampling time instant, and
means for filtering the sequence of input samples for the selected sampling time instant with the equalizer coefficients.

18. The apparatus of claim 15, wherein the means for filtering comprises means for filtering input samples for the selected sampling time instant with the equalizer coefficients and with the subsampled input signal samples.

19. A computer program product residing on a non-transitory processor-readable medium of a wireless communication device and comprising instructions configured to cause a processor to:
select a sampling time instant from among multiple sampling time instants of an input signal to the device;
derive equalizer coefficients for the selected sampling time instant in accordance with subsampled impulse response channel estimates of the input signal and covariance values of subsampled input signal samples of the input signal for the selected sampling time instant; and
filter input samples for the selected sampling time instant with the equalizer coefficients.

20. The computer program product of claim 19, wherein the instructions configured to cause the processor to select the sampling time instant are configured to cause the processor to:
determine energies of multiple channel impulse response estimates for the multiple sampling time instants, and
select the sampling time instant with a largest energy among the multiple sampling time instants.

21. The computer program product of claim 19, wherein the instructions configured to cause the processor to filter the input samples are configured to cause the processor to:
receive input samples at multiple times chip rate,
demultiplex the input samples into multiple sequences for the multiple sampling time instants, one sequence for each sampling time instant, and
filter the sequence of input samples for the selected sampling time instant with the equalizer coefficients.

22. The computer program product of claim 18, wherein the instructions configured to cause the processor to filter the input samples are further configured to cause the processor to filter input samples for the selected sampling time instant with the equalizer coefficients and with the subsampled input signal samples.

* * * * *